United States Patent
Zhao et al.

(10) Patent No.: US 11,606,571 B2
(45) Date of Patent: Mar. 14, 2023

(54) SPATIAL VARYING TRANSFORM FOR VIDEO CODING

(71) Applicant: Huawei Technologies Co., Ltd., Shenzhen (CN)

(72) Inventors: Yin Zhao, Shenzhen (CN); Haitao Yang, Shenzhen (CN); Shan Liu, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/848,555

(22) Filed: Apr. 14, 2020

(65) Prior Publication Data

US 2020/0244976 A1     Jul. 30, 2020
US 2022/0217370 A9     Jul. 7, 2022

Related U.S. Application Data

(63) Continuation of application No. PCT/CN2018/110399, filed on Oct. 16, 2018.
(Continued)

(51) Int. Cl.
*H04N 19/196* (2014.01)
*H04N 19/119* (2014.01)
(Continued)

(52) U.S. Cl.
CPC ......... *H04N 19/196* (2014.11); *H04N 19/119* (2014.11); *H04N 19/176* (2014.11); *H04N 19/61* (2014.11); *H04N 19/70* (2014.11)

(58) Field of Classification Search
None
See application file for complete search history.

(56) References Cited

U.S. PATENT DOCUMENTS 8,526,495 B2   9/2013   Liu et al.
9,049,452 B2   6/2015   Liu et al.
(Continued)

FOREIGN PATENT DOCUMENTS

CN    102165771 A    8/2011
CN    103108181 A    5/2013
(Continued)

OTHER PUBLICATIONS

Zhang et al., "Video Coding Using Spatially Varying Transform," IEEE Transactions on Circuits and Systems for Video Technology, vol. 21, No. Feb. 2, 2011.*
(Continued)

*Primary Examiner* — Michael J Hess
(74) *Attorney, Agent, or Firm* — Conley Rose, P.C.

(57) ABSTRACT

A video decoding device receives a bitstream including a prediction block and a residual block with coefficients transformed by a Spatial Varying Transform (SVT). The video decoding device determines a type of SVT employed to transform the coefficients in the residual block and determines a position of the SVT relative to the residual block by determining a candidate position step size and a position index for the SVT. The video decoding device applies an inverse transform to the coefficients based on the SVT type and position to create a reconstructed residual block. The video decoding device applies the reconstructed residual block to the prediction block to reconstruct a video block and reconstructs a video sequence for display, the video sequence including a video frame that includes the reconstructed video block.

27 Claims, 11 Drawing Sheets

Related U.S. Application Data

(60) Provisional application No. 62/572,987, filed on Oct. 16, 2017, provisional application No. 62/721,179, filed on Aug. 22, 2018.

(51) Int. Cl.
  *H04N 19/176* (2014.01)
  *H04N 19/61* (2014.01)
  *H04N 19/70* (2014.01)

(56) References Cited

U.S. PATENT DOCUMENTS

| | | | |
|---|---|---|---|
| 9,363,511 | B2 | 6/2016 | Zhang et al. |
| 9,510,012 | B2 | 11/2016 | Liu et al. |
| 9,769,472 | B2 | 9/2017 | Liu et al. |
| 9,788,019 | B2 | 10/2017 | Liu et al. |
| 9,813,726 | B2 | 11/2017 | Liu et al. |
| 2008/0232705 | A1 | 9/2008 | Sohn et al. |
| 2012/0128074 | A1 | 5/2012 | Zhang et al. |
| 2013/0315302 | A1 | 11/2013 | Lim et al. |
| 2014/0086323 | A1 | 3/2014 | Chuang et al. |
| 2015/0172719 | A1 | 6/2015 | Guo et al. |
| 2015/0365692 | A1 | 12/2015 | Liu et al. |
| 2016/0142706 | A1 | 5/2016 | Chuang et al. |
| 2017/0272745 | A1 | 9/2017 | Liu et al. |
| 2017/0353730 | A1 | 12/2017 | Liu et al. |
| 2017/0374369 | A1 | 12/2017 | Chuang et al. |
| 2018/0376155 | A1 | 12/2018 | Yamamoto et al. |

FOREIGN PATENT DOCUMENTS

| | | |
|---|---|---|
| CN | 103370939 A | 10/2013 |
| JP | 2013034141 A | 2/2013 |
| JP | 2016201818 A | 12/2016 |
| WO | 2010116268 A1 | 10/2010 |

OTHER PUBLICATIONS

Zhang et al., "Prediction Signal Aided Spatially Varying Transform," 2011 IEEE International Conference on Multimedia and Expo, 2011, pp. 1-6.*

Akula, S., "Description of SDR, HDR and 360 video coding technology proposal by Samsung, Huawei, GoPro, and HiSilicon mobile application scenario," XP030151190, Joint Video Exploration Team (JVET) of ITU-T SG 16 WP 3 and ISO/IEC JTC 1/SC 29/WG 11, JVET-J0024-v2, 10th Meeting: San Diego, US, Apr. 10-20, 2018, 115 pages.

Zhao, Y., "CE6: Spatially Varying Transform (Test 6.1.12 . 1)," Joint Video Experts Team (JVET) of ITU-T SG 16 WP 3 and ISO/IEC JTC 1/SC 29/WG 11, JVET-K0139-v3, 11th Meeting: Ljubljana, SI, Jul. 10-18, 2018, XP030199419, 7 pages.

Said, A., "Description of Core Experiment 6 (CE6) : Transforms and transform signaling," Joint Video Experts Team (JVET) of ITU-T SG 16 WP 3 and ISO/IEC JTC 1/SC 29/WG 11, JVET-K1026-v1, 11th Meeting: Ljubljana, SI, Jul. 10-18, 2018, XP030200052, 13 pages.

Ugur, K., et al., "Description of video coding technology proposal by Tandberg, Nokia, Ericsson", Joint Collaborative Team on Video Coding (JCT-VC) of ITU-T SG16 WP3 and ISO/IEC JTC1/SC29/WG11; No. JCTVC-A119, 1st Meeting: Dresden, DE, Apr. 15-23, 2010, XP030007563, 33 pages.

An, J., et al., "Non-CE7: Boundary Dependent Transform for Inter Predicted Residue," Joint Collaborative Team on Video Coding (JCT-VC) of ITU-T SG16 WP3 and ISO/IEC JTC1/SC29/WG11, JCTVC-G281, 7th Meeting: Geneva, CH., Nov. 21-30, 2011, XP030110265, 10 pages.

Zhang, C., et al., "Video Coding Using Spatially Varying Transform," XP047468398, PSIYT 2009, LNCS 5414, 2009, pp. 796-806.

Zhao, X., et al., "Enhanced Multiple Transform for Video Coding," Data Compression Conference (DCC), IEEE, XP033027689, Mar. 30, 2016, pp. 73-82.

Zhang, X., "Video coding using Variable Block-Size Spatially Varying Transforms," IEEE International Conference on Acoustics, Speech and Signal Processing, Piscataway, NJ, USA, XP031459377, Apr. 19, 2009, pp. 905-908.

"Series H: Audiovisual and Multimedia Systems, Infrastructure of audiovisual services—Coding of moving video, High efficiency video coding," ITU-T, H.265, Dec. 2016, 664 pages.

Liu, S., et al., "Joint Temporal-Spatial Bit Allocation for Video Coding With Dependency," IEEE Transactions on Circuits and Systems for Video Technology, vol. 15, No. 1, Jan. 2005, pp. 15-26.

Liu, S., et al., "Hybrid global-local motion compensated frame interpolation for low bit rate video coding," J. Vis. Commun. Image R., vol. 14, 2003, pp. 61-79.

Liu, S., et al., "Global/Local Motion-Compensated Frame Interpolation for Low Bitrate Video," Image and Video Communications and Processing, vol. 3974, 2000, 12 pages.

Liu, S., et al., "Non-linear Motion-compensated Interpolation for Low Bit Rate Video," Applications of Digital Image Processing XXIII, vol. 4115, 2000, 11 pages.

Liu, S., et al., "MCI-embedded Motion Compensated Prediction for Quality Enhancement of Frame Interpolation," Multimedia Systems and Applications III, vol. 4209, Mar. 2001, 11 pages.

Liu, S., et al., "Joint Temporal-Spatial Rate Control with Approximating Rate-Distortion Models," Conference on Visual Communications and Image Processing, Jan. 20-25, 2002, 10 pages.

Liu, S., et al., Complexity Reduction of Joint Temporal-Spatial Bit Allocation Using R-D Models for Video Streaming, IEEE International Conference on Image Processing, Sep. 22-25, 2002, pp. 729-732.

Liu, S., et al., "Efficient MPEG-2 to MPEG-4 Video Transcoding," Conference on Image and Video Communications and Processing, Jan. 20-24, 2003, pp. 186-195.

Lou, J., et al., "Complexity and memory efficient GOP structures supporting VCR functionalities in H. 264/AVC," IEEE International Symposium on Circuits and Systems, 2008, pp. 636-639.

Lou, J., et al., "Trick-Play Optimization for H.264 Video Decoding," Journal of Information Hiding and Multimedia Signal Processing, TR2010-076, Sep. 2010, 15 pages.

Liu, S., et al., "Joint Temporal-Spatial Rate Control for Adaptive Video Transcoding," IEEE International Conference on Multimedia and Expo, Jul. 6-9, 2003, 4 pages.

Zhang, X., et al., "Intra Mode Coding in HEVC Standard," Visual Communications and Image Processing, Jan. 2012, 6 pages.

Liu, S., et al., "Rectangular Partitioning for Intra Prediction in HEVC," Visual Communications and Image Processing, Jan. 2012, 6 pages.

Lai, P., et al., "Combined Temporal and Inter-layer Prediction for Scalable Video Coding using HEVC," Picture Coding Symposium, 2013, pp. 117-120.

Liu, S., et al., "Remove Partition Size NxN," JCTVC-D432, Jan. 20-28, 2011, 7 pages.

Liu, S., et al., "Evaluations and suggestions for TU representation," JCTVC-E083, WG11 No. m19597, Mar. 16-23, 2011, 8 pages.

Zhang, X., et al., "Method for deriving Chroma QP from Luma QP," JCTVC-F277, Jul. 14-22, 2011, 6 pages.

Liu, S., et al., "Rectangular (2NxN and Nx2N) Intra Prediction," JCTVC-G135, WG11 No. 21687, Nov. 21-30, 2011, 6 pages.

Zhang, X., et al., "Method and syntax for quantization matrices representation," JCTVC-G152, Nov. 21-30, 2011, 8 pages.

Liu, S., et al., "Support of ChromaQPOffset in HEVC," JCTVC-G509r1, Nov. 21-30, 2011, 8 pages.

Oudin, S., et al., "Harmonization of the prediction and partitioning mode binarization of P and B slices," JCTVC-G1042, Nov. 21-30, 2011, 4 pages.

Cao, X., et al., "AHG16 Unification of SDIP and NSQT," JCTVC-H0347, Feb. 1-10, 2012, 9 pages.

Zhang, X., et al., "Non-CE6: Intra mode coding with fixed length binarization," JCTVC-H0435, WG11 No. m23311, Feb. 1-10, 2012, 5 pages.

(56) References Cited

OTHER PUBLICATIONS

Kim, J., et al., "nonTE5: Assigning intra prediction mode to inter layer intra predicted blocks in enhance layer," JCTVC-L0239, Jan. 14-23, 2013, 5 pages.
Lai, P., et al., "SCE3.4 Generalized Combined Prediction," JCTVC-M0221, Apr. 18-26, 2013, 9 pages.
Lai, P., et al., "Non-SCE3.4: Simplified Generalized Combined Prediction," JCTVC-M0222, Apr. 2013, 10 pages.
Lai, P., et al., "Non-SCE3.4: Simplified Generalized Combined Prediction," JCTVC-M0222_r1, Apr. 18-26, 2013, 9 pages.
Seregin, V., et al., "Uni-prediction for combined inter mode," JCTVC-M0445, Apr. 18-26, 2013, 11 pages.
Xu, X., et al., "On unification of intra block copy and inter-picture motion compensation," JCTVC-Q0132, Jan. 9-17, 2014, 14 pages.
Xu, X., et al., "Non-CE2: Intra BC merge mode with default candidates," JCTVC-S0123, Oct. 17-24, 2014, 7 pages.
Xu, X., et al., "CE2 Test 3.2: Intra BC merge mode with default candidates," JCTVC-T0073, Feb. 10-18, 2015, 6 pages.
Sullivan, G., et al., "Overview of the High Efficiency Video Coding (HEVC) Standard", IEEE Transactions on Circuits and Systems for Video Technology, vol. 22, No. 12, XP055388661, Dec. 2012, pp. 1649-1668.

\* cited by examiner

SPATIAL VARYING TRANSFORM FOR VIDEO CODING

CROSS-REFERENCE TO RELATED APPLICATIONS

The present application is a continuation of International Application No. PCT/CN2018/110399 filed Oct. 16, 2018, by Huawei Technologies Co., Ltd., and titled "Spatial Varying Transforms for Video Coding," which claims the benefit of U.S. Provisional Patent Application No. 62/721,179, filed Aug. 22, 2018, by Yin Zhao, et al., and titled "Spatial Varying Transform for Video Coding," and U.S. Provisional Patent Application No. 62/572,987, filed Oct. 16, 2017, by Yin Zhao, et al., and titled "Spatial Varying Transform for Video Coding," which are hereby incorporated by reference.

TECHNICAL FIELD

The present disclosure is generally related to video coding systems, and is specifically related to spatial varying transforms for compressing residual blocks that result from prediction based coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method directed to receiving a bitstream including a prediction block and a residual block with coefficients transformed by a Spatial Varying Transform (SVT). The method includes determining a type of SVT block employed to transform the coefficients in the residual block. A position of the SVT block is also determined relative to the residual block by determining a candidate position step size and a position index for the SVT block. An inverse transform is applied to the coefficients based on the SVT block type and position to create a reconstructed residual block. The reconstructed residual block is applied to the prediction block to reconstruct a video block. A video sequence is constructed for display. The video sequence includes a video frame that includes the reconstructed video block. Signaling SVT block position according to a position index, SVT block type, and candidate position step size reduces encoding size, and hence increases coding efficiency. For example, a SVT block may be positioned in many different locations relative to a residual block, which results in signaling a coordinate of the SVT block. By limiting SVT position according to SVT block type and candidate position step size, a single position index can be employed to indicate the position of the SVT block.

Optionally, in any of the preceding aspects, another implementation of the aspect includes, wherein the type of SVT block is selected from a group consisting of a vertical SVT and a horizontal SVT, the vertical SVT including a height equal to a height of the residual block and including a width equal to one half of a width of the residual block, and the horizontal SVT including a height equal to one half of a height of the residual block and including a width equal to a width of the residual block. An SVT block can occupy many difference positions relative to a residual block. By limiting the SVT to a vertical SVT and a horizontal SVT, the number of potential positions is reduced. This allows SVT position to be indicated by a single index, which reduces coding size. This also reduces the number of potential positions the SVT can occupy, and hence reduces the number of alternative encoding schemes that are tested by an encoder when performing rate distortion optimization.

Optionally, in any of the preceding aspects, another implementation of the aspect includes, wherein the position of the SVT block is determined by multiplying the candidate position step size and a position index.

Optionally, in any of the preceding aspects, another implementation of the aspect includes, wherein the candidate position step size is determined for a vertical SVT type by dividing a width of the residual block by a predetermined integer (M1) or determined for a horizontal SVT type by dividing a height of the residual block by a predetermined integer (M2).

Optionally, in any of the preceding aspects, another implementation of the aspect includes, wherein the candidate position step size is determined for the vertical SVT by selecting a maximum value between a minimum step size (Th1) and a result of dividing the width of the residual block by M1, and wherein the candidate position step size is determined for the horizontal SVT by selecting a maximum value between a minimum step size (Th2) and a result of dividing the height of the residual block by M2. By determining a candidate position step size at a decoder, the candidate position may not be explicitly signaled, which may reduce the size of the encoding, and hence increase coding efficiency.

Optionally, in any of the preceding aspects, another implementation of the aspect includes, wherein M1 is set to eight when the width of the residual block is greater than or equal to the height of the residual block and set to four when the width of the residual block is less than the height of the residual block, and wherein M2 is set to eight when the height of the residual block is greater than or equal to the width of the residual block and set to four when the height of the residual block is less than the width of the residual block.

Optionally, in any of the preceding aspects, another implementation of the aspect includes, wherein M1, M2, Th1, Th2, or combinations thereof are obtained from a syntax element in the bitstream. By signaling such information in syntax elements, the decoder can determine the candidate position step size for multiple blocks and/or frames based on a small group of syntax elements, which decreases encoding size.

Optionally, in any of the preceding aspects, another implementation of the aspect includes, further comprising obtaining the position index from the bitstream.

Optionally, in any of the preceding aspects, another implementation of the aspect includes, further comprising determining the position index by applying an arithmetic operation on the coefficients in the residual block. By determining the position index based on an arithmetic operation at the decoder, the position index need not be separately signaled, which decreases encoding size.

Optionally, in any of the preceding aspects, another implementation of the aspect includes, wherein the arithmetic operation includes a sum operation, a modulo operation, division operation, or combinations thereof.

Optionally, in any of the preceding aspects, another implementation of the aspect includes, wherein the position index is obtained from the bitstream when a number of coefficients is less than or equal to a threshold, and wherein the position index is determined by applying the arithmetic operation to the coefficients when the number of coefficients is greater than the threshold. This approach allows the position index to be omitted as a separate data element when a sufficient number of coefficients are present and to be signaled as a separate index when few coefficients are present. Accordingly, coefficients need not be unnecessarily added to support SVT block position signaling, which may increase the encoding size in some cases.

Optionally, in any of the preceding aspects, another implementation of the aspect includes, wherein the type of the SVT block is determined based on a first group of coefficients, and the position index is determined based on a second group of coefficients. This approach allows both SVT block type and position to be determined by examining the coefficients, which are already present in the bitstream to support video reconstruction. Accordingly, SVT block type and position can be omitted as separate data elements in the bitstream, which decreases encoding size.

Optionally, in any of the preceding aspects, another implementation of the aspect includes, wherein the candidate position step size or a corresponding number of candidate positions is determined based on a number or position of non-zero coefficients. This approach allows the candidate position to be signaled by examining the coefficients, which are already present in the bitstream to support video reconstruction. Accordingly, SVT candidate positions be signaled and yet be omitted as separate data elements in the bitstream, which decreases encoding size.

In an embodiment, the disclosure includes a video coding device. The video coding device comprises a receiver configured to receive a bitstream including a prediction block and a residual block with coefficients transformed by a Spatial Varying Transform (SVT). The video coding device also comprises a processor coupled to the receiver. The processor is configured to determine a type of SVT block employed to transform the coefficients in the residual block. The processor also determines a position of the SVT block relative to the residual block by determining a candidate position step size and a position index for the SVT block. The processor applies an inverse transform to the coefficients based on the SVT block type and position to create a reconstructed residual block. The processor also applies the reconstructed residual block to the prediction block to reconstruct a video block. The processor can then reconstruct a video sequence for display, where the video sequence including a video frame that includes the reconstructed video block. Signaling SVT block position according to a position index, SVT block type, and candidate position step size reduces encoding size, and hence increases coding efficiency. For example, a SVT block may be positioned in many different locations relative to a residual block, which results in signaling a coordinate of the SVT block. By limiting SVT position according to SVT block type and candidate position step size, a single position index can be employed to indicate the position of the SVT block.

Optionally, in any of the preceding aspects, another implementation of the aspect includes, wherein the type of SVT block is selected from a group consisting of a vertical SVT and a horizontal SVT, the vertical SVT including a height equal to a height of the residual block and including a width equal to one half of a width of the residual block, and the horizontal SVT including a height equal to one half of a height of the residual block and including a width equal to a width of the residual block. An SVT block can occupy many difference positions relative to a residual block. By limiting the SVT to a vertical SVT and a horizontal SVT, the number of potential positions is reduced. This allows SVT position to be indicated by a single index, which reduces coding size. This also reduces the number of potential positions the SVT can occupy, and hence reduces the number of alternative encoding schemes that are tested by an encoder when performing rate distortion optimization.

Optionally, in any of the preceding aspects, another implementation of the aspect includes, wherein the position of the SVT block is determined by multiplying the candidate position step size and a position index.

Optionally, in any of the preceding aspects, another implementation of the aspect includes, wherein the candidate position step size is determined for a vertical SVT type by dividing a width of the residual block by a predetermined integer (M1) or determined for a horizontal SVT type by dividing a height of the residual block by a predetermined integer (M2).

Optionally, in any of the preceding aspects, another implementation of the aspect includes, wherein the candidate position step size is determined for the vertical SVT by selecting a maximum value between a minimum step size (Th1) and a result of dividing the width of the residual block by M1, and wherein the candidate position step size is determined for the horizontal SVT by selecting a maximum value between a minimum step size (Th2) and a result of dividing the height of the residual block by M2. By determining a candidate position step size at a decoder, the candidate position may not be explicitly signaled, which may reduce the size of the encoding, and hence increase coding efficiency.

Optionally, in any of the preceding aspects, another implementation of the aspect includes, wherein M1 is set to eight when the width of the residual block is greater than or equal to the height of the residual block and set to four when the width of the residual block is less than the height of the residual block, and wherein M2 is set to eight when the height of the residual block is greater than or equal to the width of the residual block and set to four when the height of the residual block is less than the width of the residual block.

Optionally, in any of the preceding aspects, another implementation of the aspect includes, wherein M1, M2, Th1, Th2, or combinations thereof are obtained from a syntax element in the bitstream. By signaling such information in syntax elements, the decoder can determine the candidate position step size for multiple blocks and/or frames based on a small group of syntax elements, which decreases encoding size.

Optionally, in any of the preceding aspects, another implementation of the aspect includes, wherein the processor is further configured to obtain the position index from the bitstream.

Optionally, in any of the preceding aspects, another implementation of the aspect includes, wherein the processor is further configured to determine the position index by applying an arithmetic operation on the coefficients in the residual block. By determining the position index based on an arithmetic operation at the decoder, the position index need not be separately signaled, which decreases encoding size.

Optionally, in any of the preceding aspects, another implementation of the aspect includes, wherein the arithmetic operation includes a sum operation, a modulo operation, division operation, or combinations thereof.

Optionally, in any of the preceding aspects, another implementation of the aspect includes, wherein the position index is obtained from the bitstream when a number of coefficients is less than or equal to a threshold, and wherein the position index is determined by applying the arithmetic operation to the coefficients when the number of coefficients is greater than the threshold. This approach allows the position index to be omitted as a separate data element when a sufficient number of coefficients are present and to be signaled as a separate index when few coefficients are present. Accordingly, coefficients need not be unnecessarily added to support SVT block position signaling, which may increase the encoding size in some cases.

Optionally, in any of the preceding aspects, another implementation of the aspect includes, wherein the type of the SVT block is determined based on a first group of coefficients, and the position index is determined based on a second group of coefficients. This approach allows both SVT block type and position to be determined by examining the coefficients, which are already present in the bitstream to support video reconstruction. Accordingly, SVT block type and position can be omitted as separate data elements in the bitstream, which decreases encoding size.

Optionally, in any of the preceding aspects, another implementation of the aspect includes, wherein the candidate position step size or a corresponding number of candidate positions is determined based on a number or position of non-zero coefficients. This approach allows the candidate position to be signaled by examining the coefficients, which are already present in the bitstream to support video reconstruction. Accordingly, SVT candidate positions be signaled and yet be omitted as separate data elements in the bitstream, which decreases encoding size.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the any of the preceding aspects.

In an embodiment, the disclosure includes a video coding device. The video coding device comprises a receiving means configured to receive a bitstream including a prediction block and a residual block with coefficients transformed by a Spatial Varying Transform (SVT). The video coding device comprises also include a processing means configured to perform any of the preceding aspects in conjunction with the receiving means.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
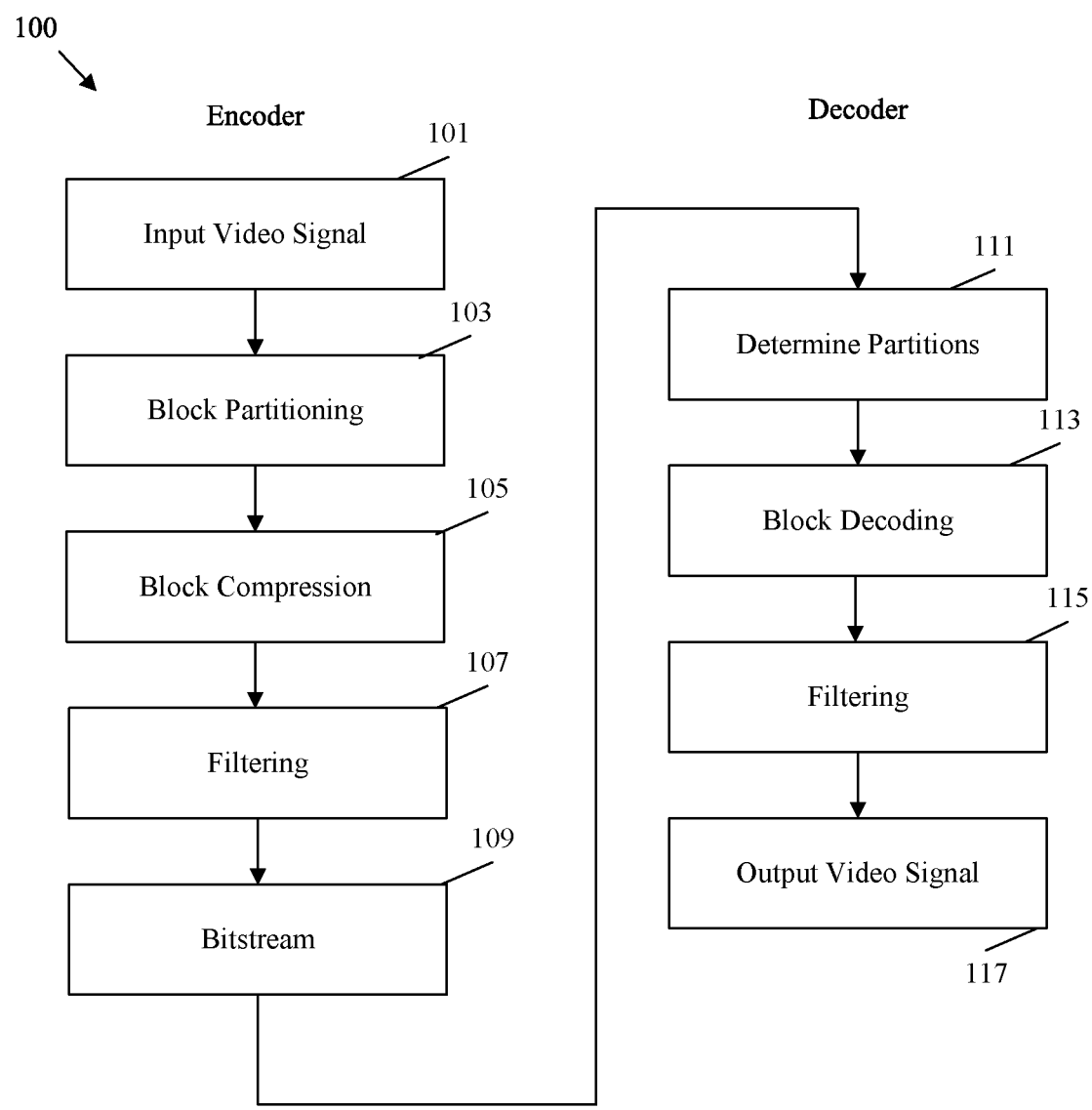
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video coding involves a combination of compression by inter-prediction (prediction between frames) and intra-prediction (prediction within a frame). This results in the creation of prediction blocks and residual blocks. A prediction block is a block of prediction information that can be employed to reconstruct a block of pixels in a video frame. Prediction blocks are generated by denoting a relationship to other blocks of pixels that act as reference blocks. A residual block stores differences between the reference block(s) referred to by the prediction block and the original block of pixels being compressed. A residual block can also be further compressed. For example, a transform can be applied to the residual data, which turns the corresponding residual data into transform coefficients. A transform is essentially a signal/pattern. Coefficients describe modifications to the pattern that cause the pattern to match the data. Such coefficients may take up less space than the underlying residual data in the residual block.

However, in some cases, the residual block includes an uneven distribution of data. For example, significant portions of the residual block may contain zero values as data. Applying a transform to such areas may actually increase the size of data. Accordingly, SVT may be employed. SVT is a process that applies a transform block to only a portion of the residual data in the residual block and leaves other data untransformed. The non-zero residual data may be distributed unevenly across the residual block, and such distribution may vary from block to block. SVT allows the transform block to be placed at different locations relative to the residual block in order to optimize compression. In one example, SVT employs transform blocks that are a quarter of the size of the residual block. Some of the transform blocks in this example have a height that is less than the height of the residual block and a width that is less than the width of the residual block. This means such a transform can be positioned in a large number of locations, known as candidate positions (e.g., eighty one possible candidate positions in one example). Hence, when SVT is used, the position may be signaled and the signaling overhead of such position information may be significant when a large number of possible candidate positions are available. This is because the position may be signaled by a number of bits needed to uniquely denote the chosen transform position from the total group of candidate transform positions. As the residual block gets larger, the number of candidate positions increases, which further increases signaling overhead and reduces compression efficiency. In addition, in practice, the quarter size of the SVT transform may be insufficient to cover the majority of the non-zero data in the residual block in many cases, and hence may be a sub-optimal tradeoff between transform compression and signaling overhead. Also, the encoder employs a rate distortion optimization (RDO) process that includes checking all possible encoding options for each frame, considering compression and video quality degradation, and selecting the best coding technique for the frame. Larger numbers of candidate transform positions increase the complexity of the RDO process by creating more potential encoding options to check, and hence numbers of candidate transform positions may be undesirable.

Disclosed herein is an improved SVT scheme that results in increased compression and/or lower signaling overhead. The disclosed SVT blocks are selected to be one half of the size of the residual blocks. Specifically, a vertical SVT block and/or a horizontal SVT block are employed. The vertical SVT block includes the same height as the residual block and half the width of the residual block. The horizontal SVT block includes the same width as the residual block and half the height of the residual block. This approach significantly reduces the number of candidate positions, and hence significantly reduces SVT signaling overhead. Also, the increased SVT block size transforms a larger portion of the residual data. For example, as only two SVT blocks are employed, the SVT block type to be employed can be signaled with a single bit. Also, the SVT block position can be signaled by a candidate position step size and/or a position index. These values can be employed by a decoder to determine an offset employed to determine the SVT block position relative to the residual block (e.g., instead of employing both a height coordinate and a width coordinate). In some examples, the candidate position step size can be predefined to further reduce signaling overhead. In other examples, the encoder can alter some of the residual coefficients for signaling purposes. The decoder can then determine the SVT block type, the SVT block candidate position step size, and/or the SVT block position index based on the residual coefficients.

FIG. 1 is a flowchart of an example method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components, and color, which is referred to as chroma components. In some examples, the frames may also contain depth values to support three dimensional viewing.

At step 103, the video is partitioned into blocks. Partitioning includes subdividing the pixels in each frame into square and/or rectangular blocks for compression. For example, coding trees may be employed to divide and then recursively subdivide blocks until configurations are achieved that support further encoding. As such, the blocks may be referred to as coding tree units in High Efficiency Video Coding (HEVC) (also known as H.265 and Motion Picture Experts Group (MPEG)-H Part 2). For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement (or lack thereof). A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order. Further, decoding at steps 111, 113, 115, and 117 may occur continuously and/or simultaneously over many frames and blocks, and hence the order shown for decoding should also not be considered limiting.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options (e.g., candidates). Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs inverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

The present disclosure relates to modifications to improve SVT. Specifically, the present disclosure introduces improved SVT blocks for use as transforms applied to residual blocks. The improved SVT blocks are larger than legacy SVT blocks. Accordingly, the improved SVT blocks have fewer candidate positions, resulting in reduced signaling overhead. Further, improved signaling mechanisms for SVT block type and position are disclosed. Hence, the improved SVT blocks and signaling mechanisms described in the FIGS. below improve the block compression at step 105, the bitstream encoding at step 109, receipt of the bitstream at the decoder, and the block decoding at step 113.

Figure 2:
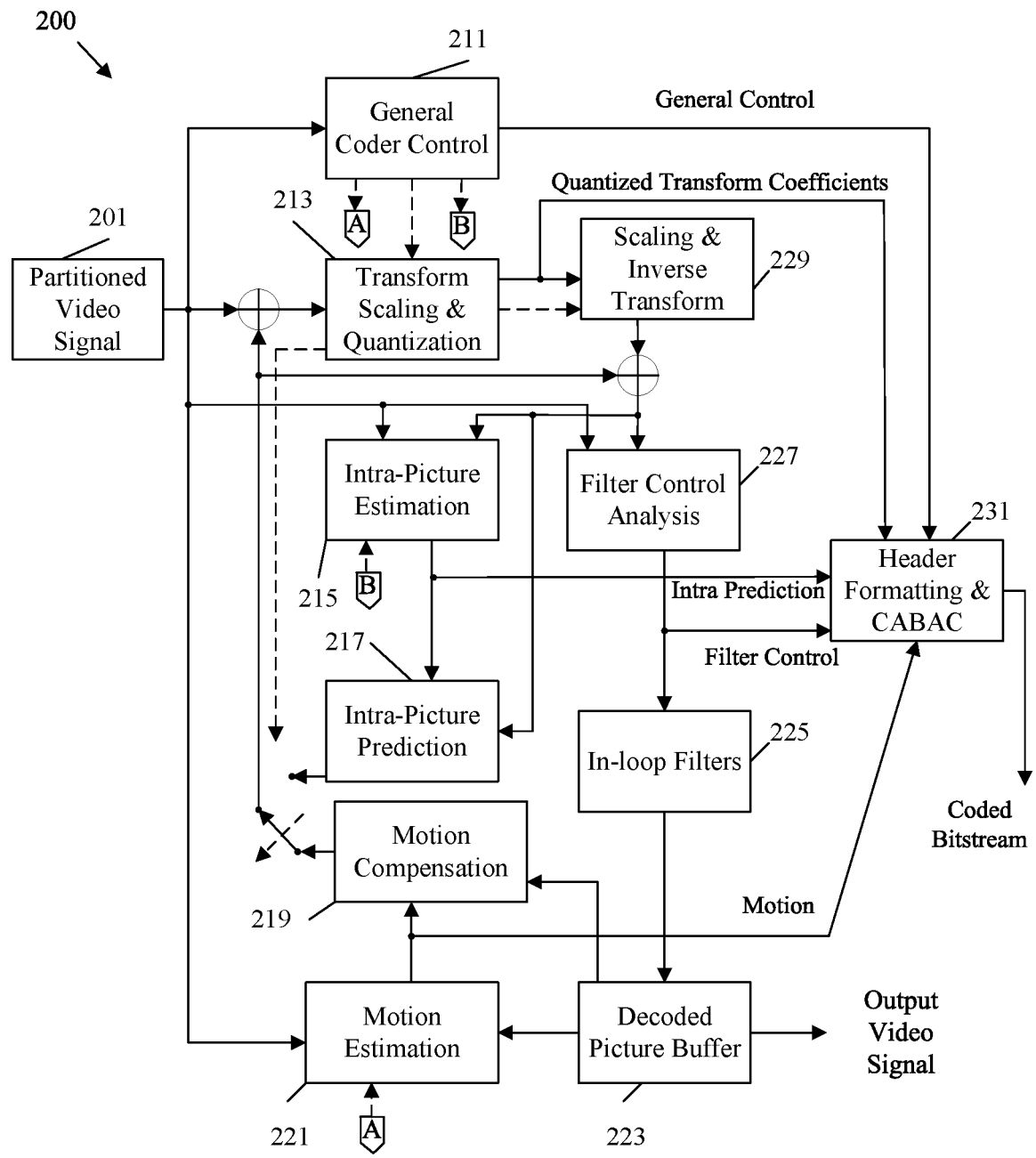
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of method 100. Codec system 200 is generalized to depict components employed in both an encoder and a decoder. Codec system 200 receives and partitions a video signal as discussed with respect to steps 101 and 103 in method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks are referred to as coding units (CUs) in some cases. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns (e.g., rate distortion optimization). The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a coding tree unit (CTU), coding tree blocks (CTBs), and CUs. For example, a CTU can be divided into CTBs, which can then be divided into CUs, which can be further sub-divided as desired. A CU can be encoded as a prediction unit (PU) containing prediction data and/or a transform unit (TU) containing transformed residual data for the CU. The motion estimation component 221 generates motion vectors, PUs, and TUs by using a rate-distortion analysis. For example, the motion estimation component 221 may determine multiple reference blocks, multiple motion vectors, etc., for a current block/frame, and may select the reference blocks, motion vectors, etc., having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as code word mapping tables), definitions of encoding contexts for various blocks, indications of most probable intra-prediction modes, an indication of partition information, etc. Such data may be encoded be employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

The present disclosure relates to modifications to improve SVT. Specifically, the present disclosure introduces improved SVT blocks for use as transforms applied to residual blocks. The improved SVT blocks are larger than legacy SVT blocks. Accordingly, the improved SVT blocks have fewer candidate positions, resulting in reduced signaling overhead. Further, improved signaling mechanisms for SVT block type and position are disclosed. Hence, improved SVT blocks and signaling mechanisms described in the FIGS. below improve the operation of transform scaling and quantization component 213, scaling and inverse transform component 229, header formatting and CABAC component 231, and/or general coder control component 211.

Figure 3:
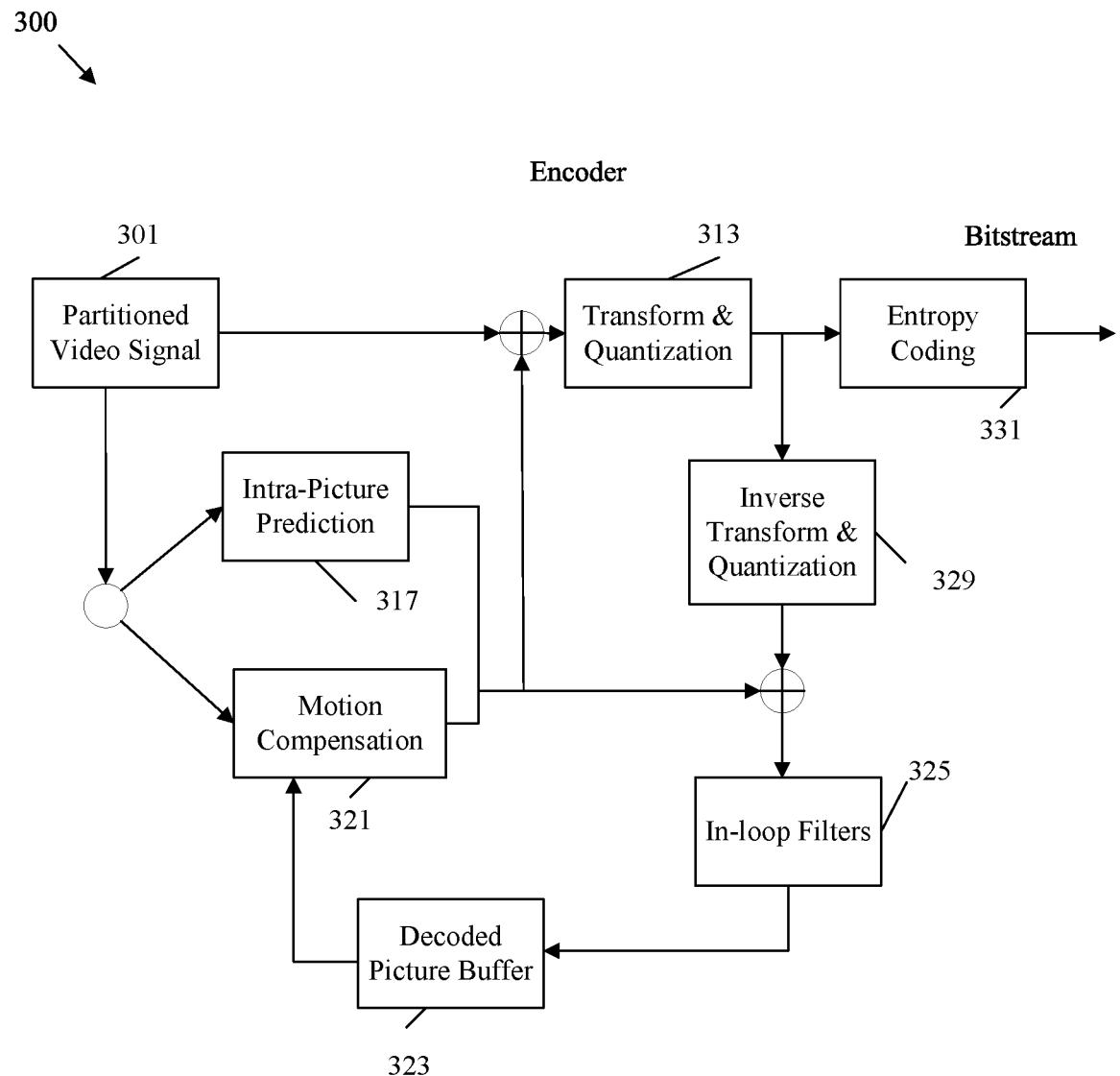
FIG. 3 is a schematic diagram illustrating an example video encoder that may implement a Spatial Varying Transforms (SVTs).

FIG. 3 is a block diagram illustrating an example video encoder 300 that may implement an SVT. Video encoder 300 may be employed to implement the encoding functions of codec system 200 and/or implement steps 101, 103, 105, 107, and/or 109 of method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the reconstructed reference blocks. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

The present disclosure relates to modifications to improve SVT. Specifically, the present disclosure introduces improved SVT blocks for use as transforms applied to residual blocks. The improved SVT blocks are larger than legacy SVT blocks. Accordingly, the improved SVT blocks have fewer candidate positions, resulting in reduced signaling overhead. Further, improved signaling mechanisms for SVT block type and position are disclosed. For example, the SVT type and/or position may be signaled as a parameter in a parameter set. In another example, the encoder 300 can alter coefficients in a transformed residual block to signal the SVT type and/or position. Hence, the improved SVT blocks and signaling mechanisms described in the FIGS. below improve the operation of the transform and quantization component 313, the inverse transform and quantization component 329, and/or the entropy coding component 331 in the encoder 300.

Figure 4:
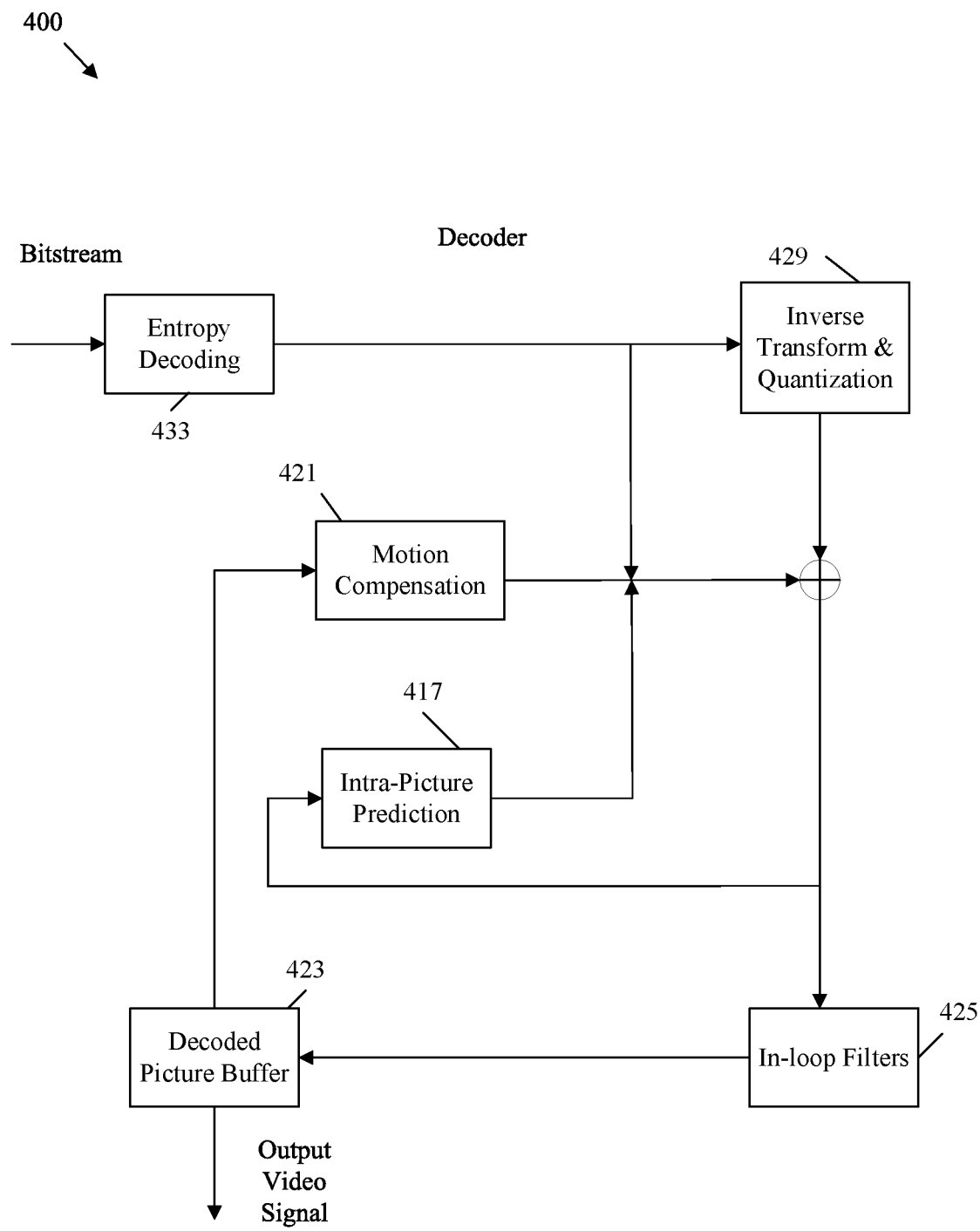
FIG. 4 is a schematic diagram illustrating an example video decoder that may implement an SVT.

FIG. 4 is a block diagram illustrating an example video decoder 400 that may implement an SVT. Video decoder 400 may be employed to implement the decoding functions of codec system 200 and/or implement steps 111, 113, 115, and/or 117 of method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

The present disclosure relates to modifications to improve SVT. Specifically, the present disclosure introduces improved SVT blocks for use as transforms applied to residual blocks. The improved SVT blocks are larger than legacy SVT blocks. Accordingly, the improved SVT blocks have fewer candidate positions, resulting in reduced signaling overhead. Further, improved signaling mechanisms for SVT block type and position are disclosed. For example, the SVT type and/or position may be signaled as a parameter in a parameter set. In another example, the encoder 300 can alter coefficients in a transformed residual block to signal the SVT type and/or position. Hence, the improved SVT blocks and signaling mechanisms described in the FIGS. below improve the operation of the entropy decoding component 433 and the inverse transform and quantization component 429 in the decoder 400.

The improvements to method 100, codec system 200, encoder 300, and/or decoder 400 are now generally described with further exemplary implementation details provided with respect to the following FIGS. As discussed above, an encoder (e.g., encoder 300) encodes blocks of pixels by converting such blocks into prediction information, which may also be referred to as prediction blocks. Prediction blocks encode pixel blocks by reference to corresponding reference blocks. Even well matched reference blocks may be somewhat different than the pixel blocks being encoded. As such, the prediction blocks alone may not provide sufficient information to reconstruct the pixel blocks at the decoder (e.g., decoder 400). The differences between the pixel block and the reference block(s) referred to by the prediction block are encoded in a residual block. As such, the decoder can decode a pixel block by employing a prediction block, a residual block, and corresponding reference block(s). The residual blocks may be further compressed by applying a transform to the values contained in the residual blocks. This converts the residual block values into coefficients in a transform domain (e.g., frequency domain). Transforming an entire residual block may not provide optimal compression for reasons related to transform computation mechanisms, especially when the residual block contains significant groups of zero values (which occurs in the case of a good match between the pixel block and the reference block(s)).

Accordingly, an SVT process places a transform block onto the residual block at the encoder. The transform block transforms corresponding portions of the residual block into transform coefficients and leaves other portions of the residual block untransformed. The residual block can then be encoded in a bitstream as a combination of transform coefficients and non-zero values (if any). In order to decode the residual block, the decoder should be aware of the transform used (which may be predefined), the size of the transform block, and the position of the transform block relative to the residual block. The decoder can then apply a corresponding inverse transform block to the residual block to reconstruct the residual block values for further decoding. An inverse transform is an opposite mathematical function of a transform, and can be employed to reverse a computation caused by the transform. As such, a transform can convert data values into coefficients, and an inverse transform recover the original data values based on the coefficients. It should be noted that transform/transform block are used herein to refer to a transform when encoding and a corresponding inverse transform when decoding in order to increase clarity of discussion.

Figure 5:
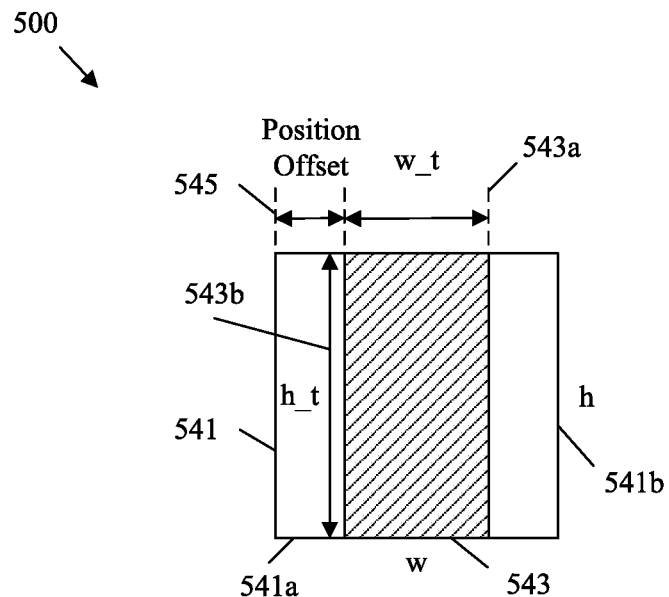
FIG. 5 is a schematic diagram illustrating an example vertical SVT.
Figure 6:
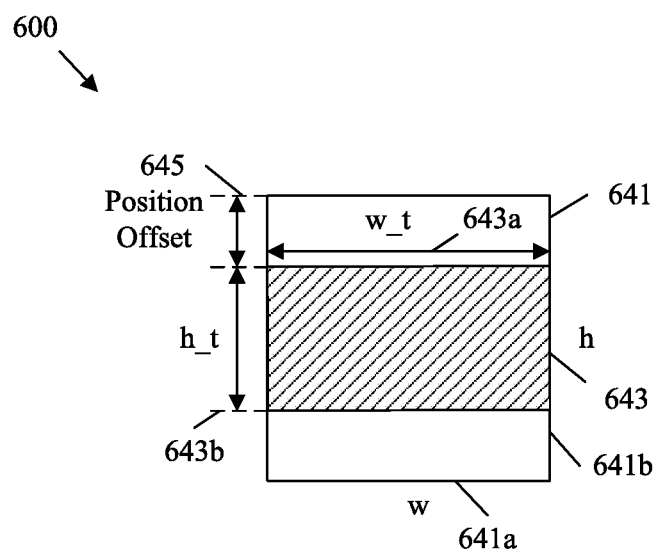
FIG. 6 is a schematic diagram illustrating an example horizontal SVT.

Signaling SVT information to support placing the transform block at the decoder may reduce overall compression/coding efficiency. The present disclosure includes SVT improvements to reduce signaling overhead, increase coding efficiency, and/or reduce complexity of the RDO process at the encoder when selecting transform blocks. In the present disclosure, the encoder is limited to selecting a vertical SVT or a horizontal SVT, as depicted in FIG. 5 and FIG. 6, respectively. As only two options are available, signaling overhead is reduced. For example, the transform block size and shape can be determined at the decoder by determining which SVT block type, vertical or horizontal, is employed. The vertical SVT and horizontal SVT cover half the size of the residual blocks, and hence transform more of the residual blocks than other SVT schemes (which only cover one quarter of the size of the residual blocks). Further, the vertical SVT is the height of the residual block and the horizontal SVT is the width of the residual block. This limits the position of the transform block to a small group of corresponding vertical SVT candidate positions or horizontal candidate positions, examples of which are shown in FIG. 7 and FIG. 8, respectively. The position of the transform block can be signaled by encoding which candidate position is selected. Specifically, the decoder can determine the selected candidate position for the SVT block by determining the SVT block type, a candidate position step size, and a position index. The SVT block type and the position index may be signaled, and the candidate position step size may be predefined or signaled, depending on the example. The SVT block type, candidate position step size, and/or position index are referred to herein as SVT information.

Figure 9:
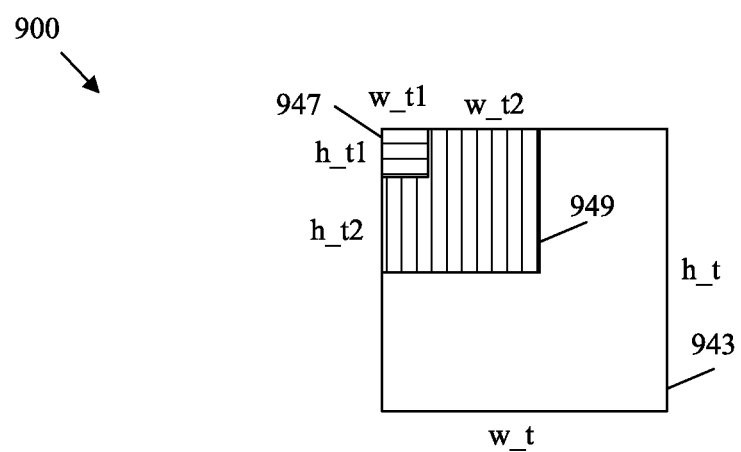
FIG. 9 is a schematic diagram illustrating an example transform coefficient groups.

The present disclosure also includes improved signaling mechanisms for signaling the SVT information. In some examples, the SVT information is signaled in parameters sets, such as a sequence parameter set (SPS), a picture parameter set (PPS), a slice header, etc. In some examples, some or all of the SVT information may be signaled by the coefficients in the residual block in order to reduce signaling overhead. For example, the encoder can adjust residual values/transform coefficients without significantly affected overall image quality. As such, the encoder can adjust residual values/transform coefficients in certain predefined positions to indicate the SVT information or portions thereof. The decoder can then review groups of residual values/transform coefficients at predefined positions(s) to determine the SVT information. An example of such coefficient groups is shown in FIG. 9. As a particular example, the decoder can apply arithmetic functions, such as summation or modulo operations to predefined groups to determine the SVT information, either alone or in combination with signaling in a parameter set. Details of the preceding improvements are now discussed below with respect to the corresponding FIGS.

It should be noted that SVT may be restricted for use in relation to inter-prediction based prediction blocks in some examples. In other examples, SVT may also be used for intra-prediction based prediction blocks. In some examples, SVT may be employed for prediction blocks using specific inter-prediction mechanisms (e.g., translation model based motion compensation), but not employed for prediction blocks using other inter-prediction mechanisms (e.g., affine model based motion compensation).

FIG. 5 is a schematic diagram 500 illustrating an example vertical SVT 543. The vertical SVT 543 is a SVT block (e.g., a vertical SVT block) that can be positioned onto a residual block 541 based on a position offset 545. For example, the vertical SVT 543 can transform a residual block 541 employed at step 105 and/or 113 of method 100. Further, the vertical SVT 543 can be employed by a transform scaling and quantization component 213, a scaling and inverse transform component 229, a transform and quantization component 313, an inverse transform and quantization component 329, and/or an inverse transform and quantization component 429. The vertical SVT 543 is a block that contains a transform or an inverse transform, depending on the example, for transforming data values in a residual block 541 from a pixel domain to a frequency/transform domain and vice versa, respectively.

The residual block 541 contains a matrix of values that express the difference between a prediction block and one or more corresponding reference blocks. Accordingly, the residual block 541 and a corresponding prediction block can be employed to reconstruct an image block at a decoder. At the encoder, the residual block 541 initially contains varying distributions of values. The closer the match between the prediction block and the reference block(s), the fewer non-zero values are contained in the residual block 541. As such, different residual blocks 541 can contain varying numbers of zero values and varying numbers of non-zero values at varying positions. As the position of non-zero values varies, the vertical SVT 543 can be positioned at one of several candidate positions in order to cover, and hence transform, the greatest number of non-zero values possible.

At the encoder, the vertical SVT 543, which is depicted by a box with diagonal shading, can be applied to compress the residual block 541 by converting a portion of the residual block 541 values into transform coefficients. The vertical SVT 543 includes a transform, such as a DCT, DST, or other transform (e.g., Fourier related transform). The transform is a function/signal that may be expressed in terms of sinusoids with different frequencies and amplitudes. At the encoder, the transform converts the values of the residual block 541 covered by the transform into transform coefficients that denote the difference between the transform function and a signal created by the values in the residual block 541 covered by the vertical SVT 543. As such, the encoder can encode the residual block 541 in the bitstream as a combination of values and transform coefficients. Specifically, the transformed residual block 541 may include coefficients generated by the transform, and may also include untransformed values positioned outside of the area of the residual block 541 covered by the transform block. At the decoder, the residual block 541 is received as a combination of values and transform coefficients. At the decoder, the vertical SVT 543 contains an inverse transform to the transform employed at the encoder. The inverse transform can be applied to the transform coefficients to reconstruct the residual block 541 containing only numerical values. The residual block 541 can then be employed, in conjunction with a prediction block and reference block(s) to reconstruct a pixel block for use in a video sequence.

The vertical SVT 543 covers half of the area of the residual block 541. This increases the number of values in the residual block 541 that can be transformed by the vertical SVT 543 relative to other SVT schemes (which employ SVT blocks that cover a quarter of the area of the residual block). Specifically, the residual block 541 includes a width (w) 541a and a height (h) 541b. The vertical SVT 543 includes a transform width (w_t) 543a and a transform height (h_t) 543b. The vertical SVT 543 transform height 543b is equal to the residual block 541 height 541b. The vertical SVT 543 transform width 543a is one half of the residual block 541 width 541a. This allows the vertical SVT 543 to be shifted horizontally to different candidate positions relative to the residual block 541, but the vertical SVT 543 cannot be shifted vertically relative to the residual block 541. As such, the number of candidate positions for the vertical SVT 543 is a function of the residual block 541 width 541a, but not the residual block 541 height 541b. This reduces the number of possible candidate positions for the vertical SVT 543 relative to other SVT schemes.

Also, since the vertical SVT 543 can only positioned in one location from a vertical perspective, no vertical coordinate is signaled to position the vertical SVT 543. Specifically, the vertical SVT 543 can be positioned relative to the residual block by a position offset 545. The position offset 545 for the vertical SVT 543 indicates a horizontal distance between the starting position of the vertical SVT 543 and the left side of the residual block 541.

For example, candidate positions for the vertical SVT 543 can be determined according to a candidate position step size (CPSS). When employing a CPSS, candidate positions are separated with an equal space in the specified by the CPSS (e.g., in the horizontal direction for vertical SVT 543). The number of candidate positions can be reduced to no more than five in some examples. This further mitigates the overhead signaling of position information. This may also reduce decision complexity at the encoder when deciding the best transform block position in the RDO process.

The candidate position step size is a value that indicates the distance between two adjacent candidate positions relative to the residual block 541. The candidate position step size can be employed to determine a set of possible candidate positions for an SVT block. A position index is a data value that indicates a selected SVT position from the set of candidate positions. The CPSS can be calculated based on the width 541a or height 541b of the residual block 541, depending on whether a vertical SVT 543 or a horizontal SVT is employed as discussed in more detail below. For example, the CPSS for the vertical SVT 543 may be determined according to Equation 1 below:

$$CPSS = w/M1, \quad \text{Equation 1}$$

where w is the width 541a, and M1 is an integer representing a pre-defined step size, which may be in the range of two to eight. More candidate positions are allowed with a larger M1 value. In an example, M1 is set as eight, which allows for a position index from zero to four. This example is depicted in FIG. 7. As another example, the CPSS for the vertical SVT 543 may be determined according to Equation 2 below:

$$CPSS = \max(w/M1, Th1), \quad \text{Equation 2}$$

where w is the width 541a, M1 is an integer representing a pre-defined step size, Th1 is a pre-defined integer indicating a maximum step size threshold, and max( ) is a function that selects the maximum value between included values. Hence, the CPSS for a vertical SVT 543 can be a function of residual block 541 width 541a with a threshold maximum number of step sizes. In a particular example, M1 may be an integer between two and eight (e.g., eight, four, or two). Th1 may be an integer of two or more. M1 and/or Th1 can be fixed values known to the encoder/decoder and/or can be derived from a high-level syntax structure in the bitstream, such as a sequence parameter set (SPS), a picture parameter set (PPS), a slice header, etc.

By employing a CPSS, the position offset 545 can be determined, for example by employing an index. In such a case, the index can be signaled to indicate which candidate position is selected by the encoder. The decoder can then employ the index and the CPSS to determine the position offset 545, and apply the vertical SVT 543 to the residual block 541 at the proper location.

The present disclosure also includes improved signaling mechanisms for coding of SVT information. The SVT information may include the SVT type, in this case vertical SVT 543 and the position of the transform block relative to the residual block 541. In some examples, some or all of such data can be determined at the decoder by examining the transform coefficients in the residual block 541. For example, small changes in transform coefficient value in the residual block 541 may not significantly impact final image quality. Accordingly, the encoder can alter transform coefficient values in the residual block 541 to signal SVT information. The decoder can then examine the transform coefficient values in the residual block 541 to determine the SVT information. For example, the vertical SVT 543 position information, such as a position index and/or a CPSS, may be derived from the sum of the transform coefficients levels in the residual block 541. In another example, the SVT type information can be derived from the sum of a first group of transform coefficients (e.g., the first sixteen coefficients in a scan order), and the position information is derived from the sum of a second group of transform coefficients (e.g., the rest coefficients in the residual block 541). In yet another example, the number of candidate positions can be determined according to the transform coefficient information, and the position information can be decoded based on the number of candidate positions.

FIG. 6 is a schematic diagram 600 illustrating an example horizontal SVT 643. The horizontal SVT 643 is a SVT block (e.g., a horizontal SVT block) that can be positioned onto a residual block 641 based on a position offset 645. For example, the horizontal SVT 643 can transform a residual block 641 employed at step 105 and/or 113 of method 100. Further, the horizontal SVT 643 can be employed by a transform scaling and quantization component 213, a scaling and inverse transform component 229, a transform and quantization component 313, an inverse transform and quantization component 329, and/or an inverse transform and quantization component 429. The horizontal SVT 643 is a block that contains a transform or an inverse transform, depending on the example, for transforming data values in a residual block 641 from a pixel domain to a frequency/transform domain and vice versa, respectively.

The horizontal SVT 643, which is depicted by a box with diagonal shading, is substantially similar to the vertical SVT 543, but contains different dimensions. For example, the encoder can select a horizontal SVT 643 or a vertical SVT 543 to transform a residual block 541/641 depending on the distribution of non-zero values. Specifically, the residual block 641 includes a width 641a and a height 641b, and such items may be substantially similar to the residual block 541, width 541a, and height 541b, respectively. The horizontal SVT 643 also covers one half the area of the residual block 641. The horizontal SVT 643 includes a transform width (w_t) 643a and a transform height (h_t) 643b. The horizontal SVT 643 transform height 643b is one half of the residual block 641 height 641b. The horizontal SVT 643 transform width 643a is equal to the residual block 641 width 641a. This allows the vertical SVT horizontal SVT 643 to be shifted vertically to different candidate positions relative to the residual block 641 (in contrast to the horizontal shifting of the vertical SVT 543). The horizontal SVT 643 cannot be shifted horizontally relative to the residual block 641. As such, the number of candidate positions for the horizontal SVT 643 is a function of the residual block 641 height 641b, but not the residual block 641 width 641a. This reduces the number of possible candidate positions for the horizontal SVT 643 relative to other SVT schemes.

For the horizontal SVT 643, the position offset 645 indicates a vertical distance between the starting position of the horizontal SVT 643 and the top side of the residual block 641. As the horizontal SVT 643 can only be positioned at a single horizontal position, the position offset 645 contains sufficient information to position the horizontal SVT 643 relative to the residual block 641. Like the vertical SVT 543, the horizontal SVT 643 can be positioned based on a CPSS. However, when employing the horizontal SVT 643, the CPSS denotes candidate positions that are separated with an equal space in the vertical direction as specified by the CPSS. The determination of CPSS, and corresponding signaling, can be substantially similar to CPSS determination/signaling for the vertical SVT 543. However, the CPSS for the horizontal SVT 643 can be determined as a function of the residual block 641 height 641b.

For example, the CPSS for the horizontal SVT 643 may be determined according to Equation 3 below:

$$CPSS = h/M2, \quad \text{Equation 3}$$

where h is the height 541b, and M2 is an integer representing a pre-defined step size, which may be in the range of two to eight. More candidate positions are allowed with a larger M3 value. In an example, M3 is set as eight, which allows for a position index from zero to four. This example is depicted in FIG. 8. As another example, the CPSS for the horizontal SVT 643 may be determined according to Equation 4 below:

$$CPSS = \max(h/M2, Th2),\qquad \text{Equation 4}$$

where h is the height 541*b*, M2 is an integer representing a pre-defined step size, Th2 is a pre-defined integer indicating a maximum step size threshold, and max( ) is a function that selects the maximum value between included values. Hence, the CPSS for a horizontal SVT 643 can be a function of residual block 641 height 641*b* with a threshold maximum number of step sizes. In a particular example, M2 may be an integer between two and eight (e.g., eight, four, or two). Th2 may be an integer of two or more. M2 and/or Th2 can be fixed values known to the encoder/decoder and/or can be derived from a high-level syntax structure in the bitstream, such as a sequence parameter set (SPS), a picture parameter set (PPS), a slice header, etc. Further, the SVT information for the horizontal SVT 643 can be signaled by transform coefficients in a manner similar to the vertical SVT 543.

FIGS. 7A-7E are schematic diagrams illustrating example vertical SVT candidate positions 700. For example, the vertical SVT candidate positions 700 may be employed by a vertical SVT 743, which may implement a vertical SVT 543. Hence, the candidate positions 700 can be employed at step 105 and/or 113 of method 100. Further, the candidate positions 700 can be employed by a transform scaling and quantization component 213, a scaling and inverse transform component 229, a transform and quantization component 313, an inverse transform and quantization component 329, and/or an inverse transform and quantization component 429.

Figure 7A:
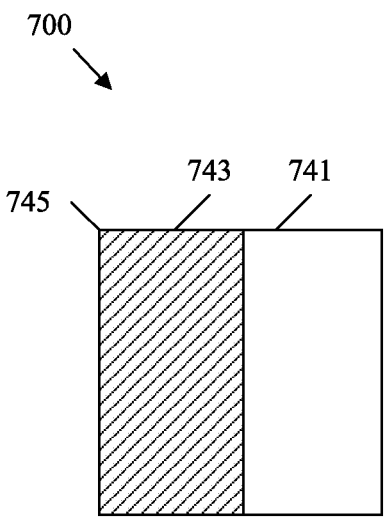
FIGS. 7A-7E are schematic diagrams illustrating example vertical SVT candidate positions.
Figure 7B:
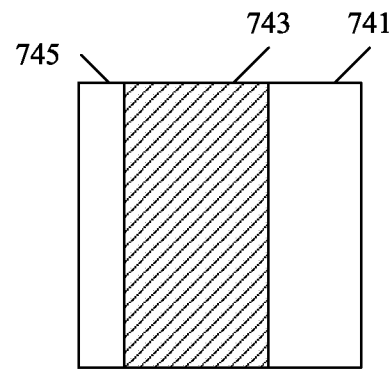
Figure 7C:
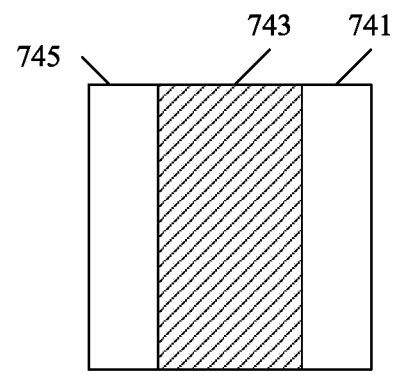
Figure 7D:
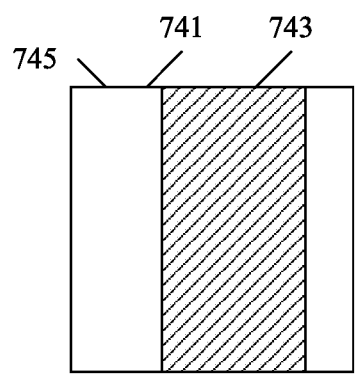
Figure 7E:
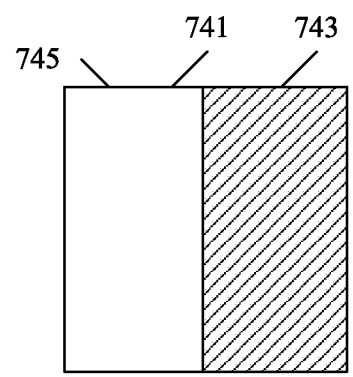

The candidate positions 700 include different possible positions a vertical SVT 743 can occupy relative to a residual block 741 based on changes in the position offset 745, which may be similar to residual block 541 and position offset 545, respectively. In the example shown, the CPSS calculation results in five possible candidate positions 700. Specifically, FIG. 7A depicts a first candidate position (e.g., position index one) where the position offset 745 is zero; FIG. 7B depicts a second candidate position (e.g., position index two) where the position offset 745 is one eighth residual block 741 width; FIG. 7C depicts a third candidate position (e.g., position index three) where the position offset 745 is one quarter residual block 741 width; FIG. 7D depicts a fourth candidate position (e.g., position index four) where the position offset 745 is three eights residual block 741 width; and FIG. 7E depicts a fifth candidate position (e.g., position index five) where the position offset 745 is one half the residual block 741 width. Accordingly, the vertical SVT 743 can be positioned on a particular residual block 741 by determining that a vertical SVT 743 is employed (e.g., instead of a horizontal SVT), determining the CPSS (e.g., in this example resulting in five candidate positions 700), and determining the position index to indicate which of the candidate positions 700 is employed. The identity of the SVT block employed, the CPSS/candidate positions, and/or the position index can be signaled between the encoder and the decoder as SVT information. The SVT information can be signaled in a parameter set or encoded in the residual block 741 coefficients. The signaling mechanisms are discussed in greater detail below.

FIGS. 8A-8E are schematic diagrams illustrating example horizontal SVT candidate positions 800. For example, the horizontal SVT candidate positions 800 may be employed by a horizontal SVT 843, which may implement a horizontal SVT 643. Hence, the candidate positions 800 can be employed at step 105 and/or 113 of method 100. Further, the candidate positions 800 can be employed by a transform scaling and quantization component 213, a scaling and inverse transform component 229, a transform and quantization component 313, an inverse transform and quantization component 329, and/or an inverse transform and quantization component 429.

Figure 8A:
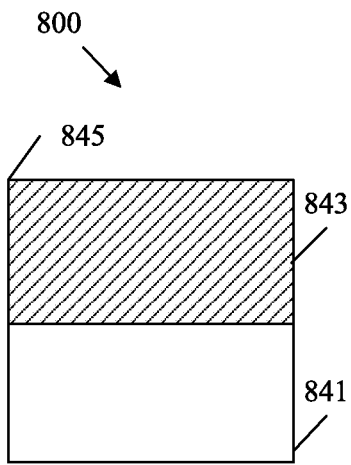
FIGS. 8A-8E are schematic diagrams illustrating example horizontal SVT candidate positions.
Figure 8B:
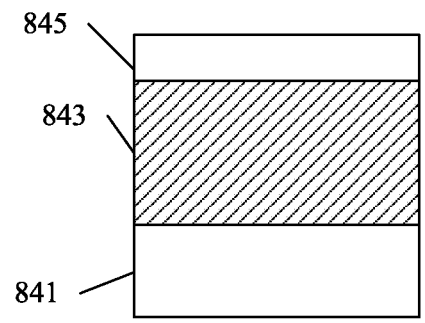
Figure 8C:
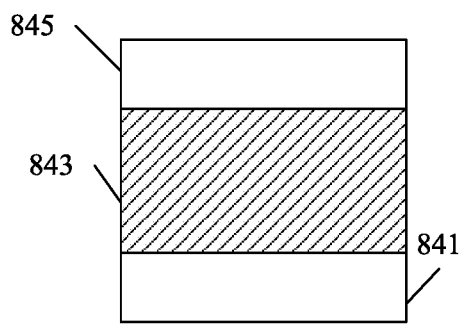
Figure 8D:
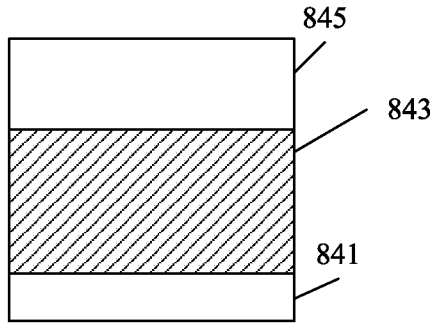
Figure 8E:
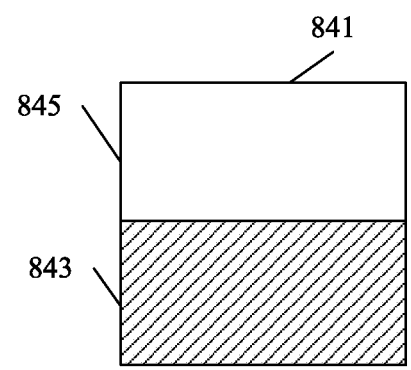

The candidate positions 800 include different possible positions a horizontal SVT 843 can occupy relative to a residual block 841 based on changes in the position offset 845, which may be similar to residual block 641 and position offset 645, respectively. In the example shown, the CPSS calculation results in five possible candidate positions 800. Specifically, FIG. 8A depicts a first candidate position (e.g., position index one) where the position offset 845 is zero; FIG. 8B depicts a second candidate position (e.g., position index two) where the position offset 845 is one eighth residual block 841 width; FIG. 8C depicts a third candidate position (e.g., position index three) where the position offset 845 is one quarter residual block 841 width; FIG. 8D depicts a fourth candidate position (e.g., position index four) where the position offset 845 is three eights residual block 841 width; and FIG. 8E depicts a fifth candidate position (e.g., position index five) where the position offset 845 is one half the residual block 841 width. Accordingly, the horizontal SVT 843 can be positioned on a particular residual block 841 by determining that a horizontal SVT 843 is employed (e.g., instead of a vertical SVT), determining the CPSS (e.g., in this example resulting in five candidate positions 800), and determining the position index to indicate which of the candidate positions 800 is employed. The identity of the SVT block employed, the CPSS/candidate positions, and/or the position index can be signaled between the encoder and the decoder as SVT information. The SVT information can be signaled in a parameter set or encoded in the residual block 841 coefficients. The signaling mechanisms are discussed in greater detail below.

FIG. 9 is a schematic diagram illustrating an example transform coefficient groups 900. For example, the transform coefficient groups 900 may be employed to signal SVT information for a vertical SVT 743 or a horizontal SVT 843, which may implement a vertical SVT 543 or a horizontal SVT 643, respectively. Hence, the transform coefficient groups 900 can be generated in response to step 105 and can signal SVT information for use at step 113 of method 100. Further, the transform coefficient groups 900 can be employed to indicate SVT information for use by a transform scaling and quantization component 213, a scaling and inverse transform component 229, a transform and quantization component 313, an inverse transform and quantization component 329, and/or an inverse transform and quantization component 429.

The transform coefficient groups 900 include transform coefficients in a residual block that have been transformed by a transform block 943 such as vertical SVT 543, vertical SVT 743, horizontal SVT 643, and/or horizontal SVT 843, depending on the example. The transform coefficient groups 900 include a first transform coefficient group 947, depicted by a box with horizontal shading, and a second transform coefficient group 949, depicted by a box with vertical shading. The first transform coefficient group 947 includes a first transform group width (w_t1) and a first transform group height (h_t1), which may be predefined. The second transform coefficient group 949 includes a second transform group width (w_t2) and a second transform group height (h_t2), which may also be predefined. Such widths and heights can vary depending on the example. Further, some examples employ both the first transform coefficient group 947 and the second transform coefficient group 949 to signal SVT information, while some examples employ a single transform coefficient group 947 or 949 to signal SVT information. It should also be noted that in some coding schemes video frames are split into luma components, known as Y components, and chroma components, known as U components and V components. Accordingly, there may be separate residual blocks, and hence different groups of transform coefficients for Y, U, and/or V components.

In one example, at least some of the SVT information can be determined by determining a sum of the transform coefficients in transform block 943 of only Y components. In one example, at least some of the SVT information can be determined by determining a sum of the transform coefficients in corresponding transform blocks 943 of Y, U, and V components. In another example, at least some of the SVT information can be determined by determining the sum of the first N transform coefficients in a transform block 943 of Y components in coefficients scan order (e.g., using a zig-zag scan), where N may be an integer, such as sixteen or thirty-two.

In another example, at least some of the SVT information can be determined by determining a sum of the coefficients in the first transform coefficient group 947 with a region of size w_t1×h_t1 at the top left portion of the transform block 943. This position may correspond to lower frequency transform coefficients. In one example, w_t1 and h_t1 are both set as four. In another example, w_t1 and h_t1 are set according to Equations 5-6 below:

$$w\_t1 = \max(w/8, 4), \qquad \text{Equation 5}$$

$$h\_t1 = \max(h/8, 4), \qquad \text{Equation 6}$$

where w_t1 and h_t1 are the width and height, respectively, of the first transform coefficient group 947, h and w are the height and width, respectively of the residual block, and max( ) is a function that selects the maximum value between included values. For example, an even number sum of the first transform coefficient group 947 can indicate that a vertical SVT is employed and an odd number sum of the first transform coefficient group 947 can indicate a horizontal SVT is employed, or vice versa.

In another example, at least some of the SVT information can be determined by determining a sum of the second transform coefficient group 949. For example, the position index can be derived based on a sum of the transform coefficients in the second transform coefficient group 949. The second transform coefficient group 949 may be in a region of size w_t2×h_t2 at the top left corner of the residual block 941, not including the first transform coefficient group 947. In one example, w_t2=w_t and h_t2=h_t, and hence all coefficients apart from first transform coefficient group 947 belong to the second transform coefficient group 949. In another example, w_t2 and h_t2 are determined according to Equations 7-8 below:

$$w\_t2 = \max(w\_t/2, w\_1), \qquad \text{Equation 7}$$

$$h\_t2 = \max(h\_t2, h\_t1), \qquad \text{Equation 8}$$

where w_t2 and h_t2 are the width and height, respectively, of the second transform coefficient group 949, w_t1 and h_t1 are the width and height, respectively, of the first transform coefficient group 947, and w_t and h_t are the width and height, respectively, of the transform block 943.

In one example, the first transform coefficient group 947 can be employed to determine the SVT position index. In another example, the first transform coefficient group 947 can be employed to determine the SVT type and the second transform coefficient group 949 can be employed to determine the SVT position index, or vice versa. The coefficient scan order can be derived based on the width and height of the transform block 943. Further, when parsing the transform coefficients for SVT position, the coefficients at positions covered by the first transform coefficient group 947 can be skipped, and hence assigned to the second transform coefficient group 947.

For example, the position index for the SVT block can be determined based on the sum of the transform coefficients in a transform coefficient group 947 or 949 and the number of candidate positions associated with the SVT block. In this example, the SVT block type may be signaled in the parameter set, and the number of candidate positions can be determined based on the CPSS, which may be predefined or signaled in a parameter set. The position index may be determined according to Equation 9 below:

$$P = St \% Nt, \qquad \text{Equation 9}$$

where P is the position index, St is the sum of the transform coefficients in a transform coefficient group 947 or 949, Nt is the number of candidate positions for the SVT block, and % denotes a modulo operation which returns a remainder after division of St by Nt.

As a specific example, the parameter M1 and M2 of Equations 1-4 can be set as four, which results in three candidate positions for the horizontal SVT or vertical SVT. This sets Nt from Equation 9 to three for horizontal or vertical SVTs. The position index is then calculated as the remainder of St divided by three. In another example, the parameter M1 and M2 are set as two, which results in two candidate positions for horizontal or vertical SVTs. This sets Nt from Equation 9 to two for horizontal or vertical SVTs. The position index is then calculated as the remainder of St divided by two.

In another example, the position index may be partially decided by the transform coefficient sum from a transform coefficient group 947 or 949. The parameter M1 and M2 can be set to eight, resulting in five candidate positions the SVT. When St modulo three is equal to zero, the position index is determined to be zero, when St modulo three is equal to one the position index is determined to be four. Otherwise, the position index value is among between one and three, but undecided. Then, a syntax element having three possible values is parsed from the parameter set to determine whether the position index is equal to one, two, or three (e.g., P is set as one, two, or three if the syntax element value is zero, one, or two, respectively).

In some examples, the decoder may employ a condition check to determine whether any of the SVT information is hidden in the coefficient sum(s). For example, when the number of transform coefficients is smaller than a threshold (e.g., four or six) or the distance between the first and last coefficients are smaller than a threshold (e.g., five or six), the position index does not rely on the coefficient sum. In this case, the position index is explicitly signaled, and the decoder does not look to the transform coefficient group(s) 947 or 949 for SVT information.

Figure 10:
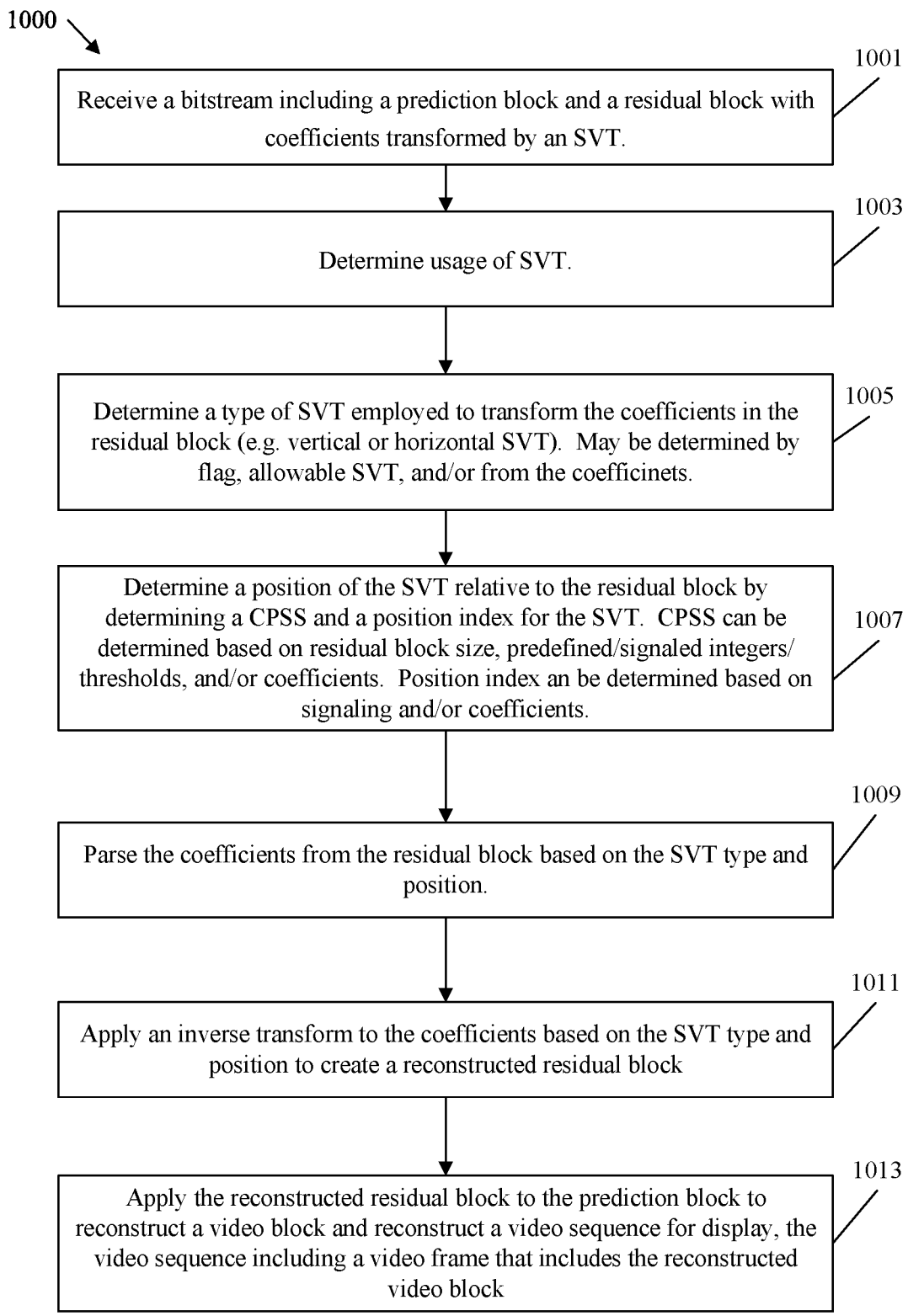
FIG. 10 is a flowchart of an example method of determining an SVT size and position.

FIG. 10 is a flowchart of an example method 1000 of determining an SVT size and position. For example, the method 1000 may employ transform coefficient groups 900 to signal SVT information. Further, the method 1000 may employ a vertical SVT 543 and/or 743 or a horizontal SVT 643 and/or 843 to transform a residual block. Hence, method 1000 can be employed as part of steps 105 and/or 113 of method 100. Further, the method 1000 can be employed by a transform scaling and quantization component 213, a scaling and inverse transform component 229, a transform and quantization component 313, an inverse transform and quantization component 329, and/or an inverse transform and quantization component 429.

At step 1001, a bitstream is received at a decoder, such as decoder 400. The bitstream contains at least one picture/frame of video data for decoding. The picture/frame is split into a plurality of rectangular image regions. Each region corresponds to a CTU. A CTU is partitioned into a plurality of blocks, such as the coding units in HEVC, according to block partition information contained in the bitstream. Coding information of the blocks are parsed from the bitstream for reconstruction of pixels of the blocks based on the coding information. In one example, a block may refer to a coding unit, where the coding unit may contain one prediction block and one residual block. The prediction block may contain the prediction samples of the coding unit. The residual block may contain the residual samples of the coding unit. The prediction block may be of the same size as the residual block. In another example, a coding unit may contain two prediction blocks and one residual block. In this case, each prediction block may contain a portion of the prediction samples of the coding unit, while the residual block contains the residual samples for the coding unit. In another example, the coding unit may contain two prediction blocks and four residual blocks. The partition pattern of residual blocks in a coding unit may be signaled in the bitstream, such as a Residual Quad-Tree (RQT) in HEVC. A block may contain only luma/Y components of image samples (or pixels) is some examples. In other examples, the block may contain luma and chroma components (Y, U, and V components) of image samples/pixels. Hence, the bitstream includes prediction blocks representing the encoded pixel blocks. The bitstream also includes residual blocks with coefficients transformed by an SVT.

At step 1003, the decoder determines whether SVT is used, as opposed to other transform mechanisms. For examples, the decoder may determine the usage of SVT according to a syntax element. For a residual block which is allowed to use SVT, a flag (namely a SVT flag (svt_flag)) may be parsed from the bitstream. The flag indicates whether the residual block is coded using a transform block of the same size as the residual block (e.g., svt_flag=0) or whether the residual block is coded with a transform block of a smaller size than the residual block (e.g., svt_flag=1). This check is employed when the residual block has non-zero transform coefficients of luma components (or chroma components in some examples). For example, a coded block flag (cbf) corresponding to a luma/chroma component may be employed to indicate whether a block has non-zero transform coefficients of a corresponding component. Further, a root coded block flag (root cbf) can be employed to indicate whether a block has non-zero transform coefficients of any color component. In one example, a residual block is allowed to use SVT when the corresponding block is predicted using inter-prediction, and either the block width or block height falls in a pre-determined range [a1, a2], where a1=16 and a2=64, a1=8 and a2=64, or a1=16 and a2=128. The value of a1 and a2 can be fixed values. The value can also be derived from a SPS, PPS, or a slice header. If the block does not use SVT, the transform block size is set as the same size as the residual block. Otherwise, the method 1000 proceeds to step 1005.

Once the method 1000 determines that SVT is employed, the type of SVT block employed to transform the coefficients in the residual block is determined at step 1005. As noted above, many different mechanisms can be employed to determine the type of SVT block used. The type of SVT block is selected from a group consisting of a vertical SVT and a horizontal SVT. The vertical SVT includes a height equal to a height of the residual block and a width equal to one half of a width of the residual block. The horizontal SVT includes a height equal to one half of a height of the residual block and including a width equal to a width of the residual block.

In one example, the type of SVT block can be determined according to a syntax element (e.g., a parameter in a parameter set). The transform block size can then be derived according to the SVT type. For example, the allowed SVT types for the residual block can be decided based on the width and height of the residual block. The vertical SVT may be allowed when the width of the residual block is in the range [a1, a2], where a1 and a2 are predefined integers. The horizontal SVT may be allowed when the residual block width is in the range [a1, a2]], where a1 and a2 are predefined integers. In some examples, SVT may only be used for the Y component. In other examples, SVT may be used for all three components. When SVT is only used for the Y component, the Y component residual block is transformed by SVT and the U and V component residual blocks are transformed according to the size of the corresponding residual blocks. When both vertical SVT and horizontal SVT are allowed, a SVT type flag (svt_type_flag) can be parsed from the bitstream. The SVT type flag may indicate whether a vertical SVT is used (e.g., svt_type_flag=0) or horizontal SVT is used (e.g., svt_type_flag=1) for the residual block. The transform block size is then set according to the signaled SVT type. For example, transform width is set to half of residual block width and transform height is set to residual block height for the vertical SVT, and transform width is set to residual block width and transform height is set to half of residual block height for the horizontal SVT. When only the vertical SVT is allowed or only the horizontal SVT is allowed, the svt_type_flag may not be parsed from the bitstream, and the transform block size is set according to the allowed SVT type.

In another example, the type of the SVT block can be determined based on a first group of coefficients as discussed with respect to FIG. 9. For example, the type of the SVT block can be determined by applying an arithmetic operation on the coefficients in the residual block (for Y components, or Y, U, and V components). Such arithmetic operation may include a sum operation, a modulo operation, a division operation, or combinations thereof. The arithmetic operation can be applied to all of the coefficients in the residual block in some examples. In other examples, the arithmetic operation can be applied to the first X coefficients in the residual block, where X is a predefined integer. In still other examples, the arithmetic operation can be applied to coefficients within a predefined area of the residual block (e.g., in the top left corner of the residual block). Regardless of the mechanism employed, the method 1000 proceeds to step 1007 upon determining the SVT block type and corresponding size.

Once the type of SVT block is determined, the position of the SVT block relative to the residual block is determined at step 1007. The position of the SVT block can be determined by determining a candidate position step size/number of candidate positions and a position index for the SVT block. This can be accomplished by several mechanisms.

In one example, a position index (P) is parsed from the bitstream. The position index P may be binarized into one or more bins using truncated unary code. For example, when the P value is in the range of zero to four, the P values 0, 4, 2, 3 and 1 are binarized as 0, 01, 001, 0001 and 0000, respectively. When the P value is in the range of zero to one, the P value 0 and 1 are binarized as 0 and 1, respectively. The position offset (Z) of the top left corner of the transform block to the top left corner of the residual block can be determined according to Equation 10 below:

$$Z = s \times P, \qquad \text{Equation 10,}$$

where s is the CPSS, P is the position index, and Z is the position offset. The value of P may be a value in the range of 0, 1, . . . , $$\frac{w - w\_t}{s}$$

for a vertical SVT. The value of P may be a value in the range of 0, 1, . . . , $$\frac{h - h\_t}{s}$$

for a horizontal SVT. Specifically, when (0, 0) represents the coordinate of the top left corner of the residual block, the coordinate of the top left corner of the transform block is (Z, 0) for a vertical SVT or (0, Z) for a horizontal SVT.

The CPSS may be calculated according to any of Equations 1-4 above. For example, Th1 and Th2 can be set as four, and M1 and M2 set as eight in such Equations, which results in candidate positions 700 and 800, depending on the SVT type and residual block width and height. Accordingly, different residual block sizes may have a different number of candidate positions. For example, when the residual block width is eight for the vertical SVT, two candidate positions 700 for the vertical SVT are available (e.g., as shown in FIGS. 7A and 7E). Further, when the residual block width is sixteen for the vertical SVT, three candidate positions 700 are available (e.g., as shown in FIGS. 7A, 7C, and 7E). In addition, when the residual block width is greater than sixteen for the vertical SVT five candidate positions 700 are available. The same approach applies to the horizontal SVT when varying residual block height.

As further particular examples of this mechanism, Equations 1 and 3 may be employed, where M1 and M2 are set to four, which results in three allowable candidate positions. Hence, the candidate position step size can be determined for a vertical SVT type by dividing a width of the residual block by a predetermined integer M1 or determined for a horizontal SVT type by dividing a height of the residual block by a predetermined integer M2. As a particular example, M1 and M2 may be set to two, which results in two allowable candidate positions.

In another example, Equations 2 and 4 may be employed. Hence, the candidate position step size can be determined for the vertical SVT by selecting a maximum value between a minimum step size Th1 and a result of dividing the width of the residual block by M1. Further, the candidate position step size can be determined for the horizontal SVT by selecting a maximum value between a minimum step size Th2 and a result of dividing the height of the residual block by M2. In some cases, the predetermined integers M1 and/or M2 can be set based on the width and/or height of the residual block. As a particular example, Th1 and Th2 can be set to two and M1 can be set as eight if the residual block width is greater than or equal to residual block height or is set as four if residual block width is less than residual block height. Also, M2 can be set as eight if the residual block height is greater than or equal to residual block width or set as four if residual block height is less than residual block width. In this case, the number of candidate positions for vertical SVT or horizontal SVT may further depend on the aspect ratio of the residual block. In another example, the CPSS is calculated according to Equations 2 and 4, where the values of M1, M2, Th1 and Th2 are derived from a high-level syntax structure in the bitstream, such as SPS, PPS, slice header, etc. M1 and M2 may share the same value parsed from a syntax element, and Th1 and Th2 may share the same value parsed from another syntax element. Accordingly, CPSS can be predefined or signaled via the bitstream. The position of the SVT block is then determined by multiplying the candidate position step size and the position index. It should also be noted that, when the position index is signaled by syntax parameters, the position index may be decoded with truncated unary code based on the number of candidate positions with the largest possible value being the number of candidate positions minus one.

In another example, the position index of the SVT is derived based on the distribution of transform coefficient. For example, the position index can be determined by applying an arithmetic operation on the coefficients in the residual block. Such an arithmetic operation can include a sum operation, a modulo operation, a division operation, or combinations thereof. For example, the position index can be determined by applying an operation to a transform coefficient group, such as one of the transform groups 900 as discussed with respect to FIG. 9. The position index can be determined by considering all the coefficients in the residual block, the coefficients in a first transform group, and/or the coefficients in a second transform group where the first transform group indicates SVT type. In another example, number of candidate positions for a residual block using SVT is derived based on the distribution of transform coefficient (e.g., by applying an arithmetic operation to a coefficient group as discussed with respect to determining a position index above).

Various combinations of the abovementioned mechanisms can also be employed. For example, the position index can be obtained from the bitstream when a number of coefficients is less than or equal to a threshold, and the position index can be determined by applying the arithmetic operation to the coefficients when the number of coefficients is greater than the threshold. As another example, the candidate position step size is determined based on a number or position of non-zero coefficients. For example, the number of non-zero transform coefficients (Nnz) can be used to decide the number of candidate positions. If Nnz is smaller than a threshold (e.g., four, five, or eight), the candidate position step size can be set as residual block width divided by four for the vertical SVT and residual block height divided by four for the horizontal SVT, which may result in three candidate positions. Otherwise, the candidate position step size can be set as residual block width divided by eight for vertical SVT and residual block height divided by eight for the horizontal SVT, which may result in five candidate positions. In another example, if the last non-zero transform coefficient is inside the top left four by four area in the transform block, the candidate position step size can be set as residual block width divided by four for the vertical SVT and residual block height divided by four for the horizontal SVT. This results in three candidate positions. Otherwise, the candidate position step size can be set as residual block width divided by eight for vertical SVT and residual block height divided by eight for horizontal SVT. This results in five candidate positions.

Regardless of the mechanism employed to determine the SVT type and position, the method 1000 proceeds to step 1009. At step 1009, the coefficients from the residual block are parsed, for example based on the SVT block type. The parsing process may employ transform coefficients parsing as described in HEVC or standard H.264, which is also known as MPEG-4 Part 10, Advanced Video Coding (MPEG-4 AVC). The transform coefficients may be coded using run-length coding. The transform coefficients may also be coded as a set of transform groups. The parsing of step 1009 includes reading the coefficients and other data from the residual block (as well as data from the prediction block and/or other relevant data) and storing such data in memory for further processing. It should be noted that the parsing of step 1009 may occur prior to step 1003, 1005, and/or 1007, depending on the example.

At step 1011, an inverse transform is applied to the coefficients based on the SVT block type and position to create a reconstructed residual block. The inverse transform may be known by the decoder and/or may be signaled in the bitstream. The SVT block type and the position provides sufficient information to position the transform relative to the information in the residual block. For example, the inverse quantization and inverse transform of size wP1×h_t are applied to the transform coefficients to recover residual samples. The size of the recovered residual samples (e.g., not including residual samples that are positioned outside of the SVT by the encoder) may be w_t×h_t, which is the same size as the transform block size. The inverse transform may be an inverse Discrete Cosine Transform (DCT) or an inverse Discrete Sine Transform (DST). The residual samples are assigned to a corresponding region inside the residual block according to the transform block position. In some examples, the remaining samples inside the residual block may be set to be zero. For example, if the vertical SVT is used, the number of candidate positions is five, and the position index is four, the reconstructed residual samples may be assigned to the shaded region in FIG. 7E and the region of size (w/2)×h outside of the shaded region may include no residual information in some cases.

At step 1013, the reconstructed residual block may be composed with a prediction block to generate the reconstructed samples in a coding unit. A filtering process may also be applied on the reconstructed samples, such as a deblocking filter and/or a SAO filter. Accordingly, the reconstructed residual block is applied to the prediction block to reconstruct a video block. The reconstructed video block is positioned with other reconstructed video blocks to create a frame/picture. The frames/pictures are placed in a sequence to reconstruct a video sequence for display. Hence, the video sequence includes a video frame that includes the reconstructed video block.

As a result of the preceding mechanisms, the candidate positions for SVT blocks can be decided by a step size related to the width and height of the residual block. The candidate positions may be limited to no more than five positions in some examples, which reduces the transform block information compared with other SVT schemes. This achieves a better balance between signaling overhead and residual coding efficiency. Further, the SVT information is coded differently than other SVT mechanisms. For example, the SVT coding information is organized as SVT usage information, SVT type information, and SVT position information, which indicates whether SVT is used, the type of SVT that is used, and the position of the SVT block, respectively. Further, the SVT position information may be derived based on the sum of a plurality of transform coefficients of the residual block. Also, the SVT type information may be derived based on the sum of a plurality of transform coefficients of the residual block.

Figure 11:
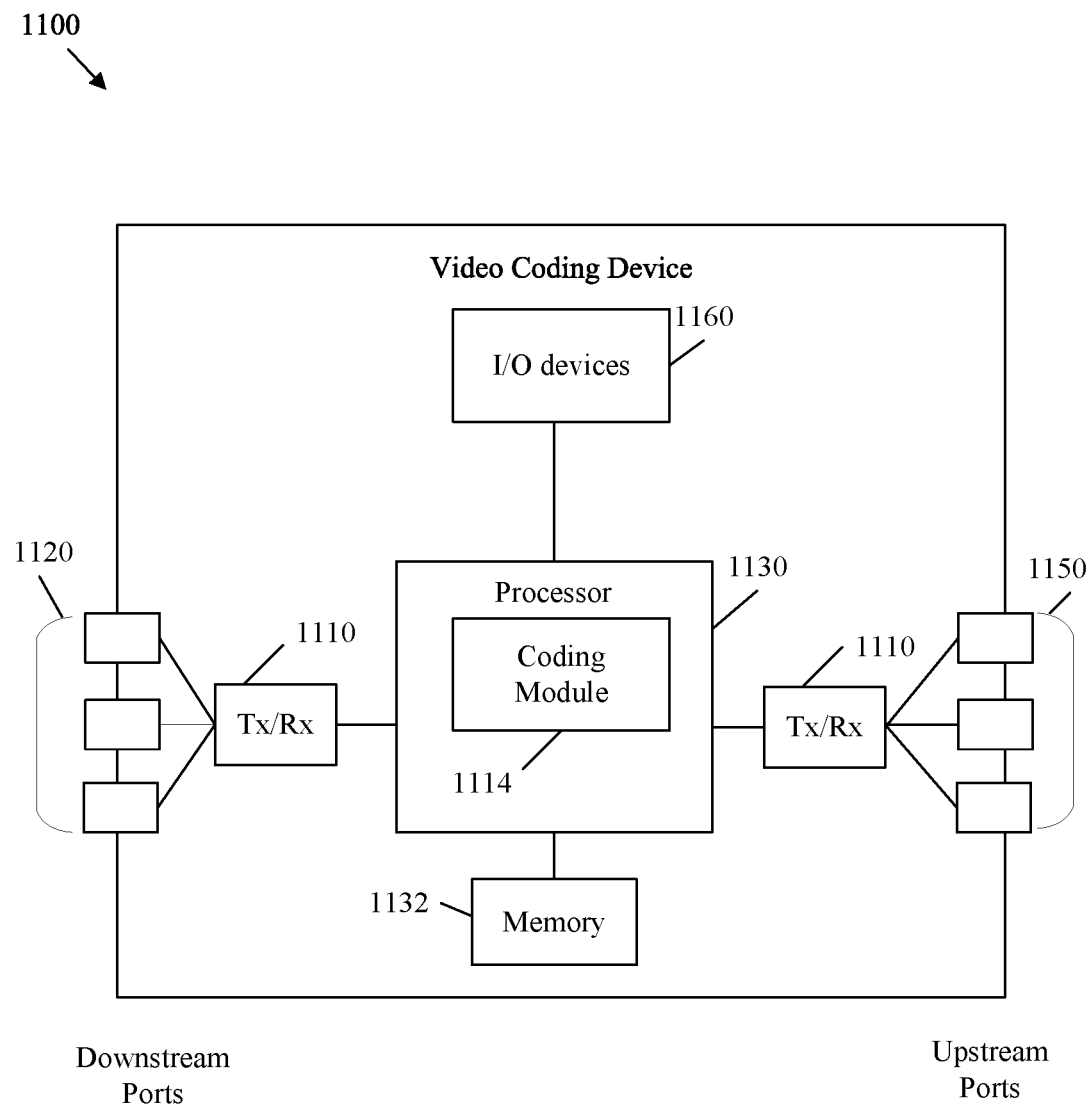
FIG. 11 is a schematic diagram of an example video coding device.

FIG. 11 is a schematic diagram of an example video coding device 1100 according to an embodiment of the disclosure. The video coding device 1100 is suitable for implementing the disclosed examples/embodiments as described herein. The video coding device 1100 comprises downstream ports 1120, upstream ports 1150, and/or transceiver units (Tx/Rx) 1110, including transmitters and/or receivers for communicating data upstream and/or downstream over a network. The video coding device 1100 also includes a processor 1130 including a logic unit and/or central processing unit (CPU) to process the data and a memory 1132 for storing the data. The video coding device 1100 may also comprise optical-to-electrical (OE) components, electrical-to-optical (EO) components, and/or wireless communication components coupled to the upstream ports 1150 and/or downstream ports 1120 for communication of data via optical or wireless communication networks. The video coding device 1100 may also include input and/or output (I/O) devices 1160 for communicating data to and from a user. The I/O devices 1160 may include output devices such as a display for displaying video data, speakers for outputting audio data, etc. The I/O devices 1160 may also include input devices, such as a keyboard, mouse, trackball, etc. and/or corresponding interfaces for interacting with such output devices.

The processor 1130 is implemented by hardware and software. The processor 1130 may be implemented as one or more CPU chips, cores (e.g., as a multi-core processor), field-programmable gate arrays (FPGAs), application specific integrated circuits (ASICs), and digital signal processors (DSPs). The processor 1130 is in communication with the downstream ports 1120, Tx/Rx 1110, upstream ports 1150, and memory 1132. The processor 1130 comprises a coding module 1114. The coding module 1114 implements the disclosed embodiments described above, such as methods 100 and/or 1000 employing improved SVTs such as vertical SVT 543 at vertical SVT candidate positions of diagram 600, horizontal SVT 643 at horizontal SVT candidate positions 700, transform coefficient groups 900 as well as any other method/mechanism described herein. Further, the coding module 1114 may implement a codec system 200, an encoder 300, and/or a decoder 400. Accordingly, the coding module 1114 can be employed to determine and/or signal an SVT type, a candidate position step size, and a position index for an SVT block. Such information can be determined/signaled in a parameter set and/or by performing operations on one or more transform coefficient groups in a residual block. The coding module 1114 can then employ the SVT type, candidate position step size, and position index position an SVT block on a residual block, apply an inverse transform, create a reconstructed residual block, reconstruct a pixel block from the residual block and a prediction block, and generate a frame for display based on the reconstructed pixel block. The inclusion of the coding module 1114 therefore provides a substantial improvement to the functionality of the video coding device 1100, by reducing the number of candidate positions for an SVT block and hence reducing corresponding signaling overhead and RDO computational complexity associated with SVT. Further, the coding module 1114 effects a transformation of the video coding device 1100 to a different state. Alternatively, the coding module 1114 can be implemented as instructions stored in the memory 1132 and executed by the processor 1130 (e.g., as a computer program product stored on a non-transitory medium).

The memory 1132 comprises one or more memory types such as disks, tape drives, solid-state drives, read only memory (ROM), random access memory (RAM), flash memory, ternary content-addressable memory (TCAM), static random-access memory (SRAM), etc. The memory 1132 may be used as an over-flow data storage device, to store programs when such programs are selected for execution, and to store instructions and data that are read during program execution.

Figure 12:
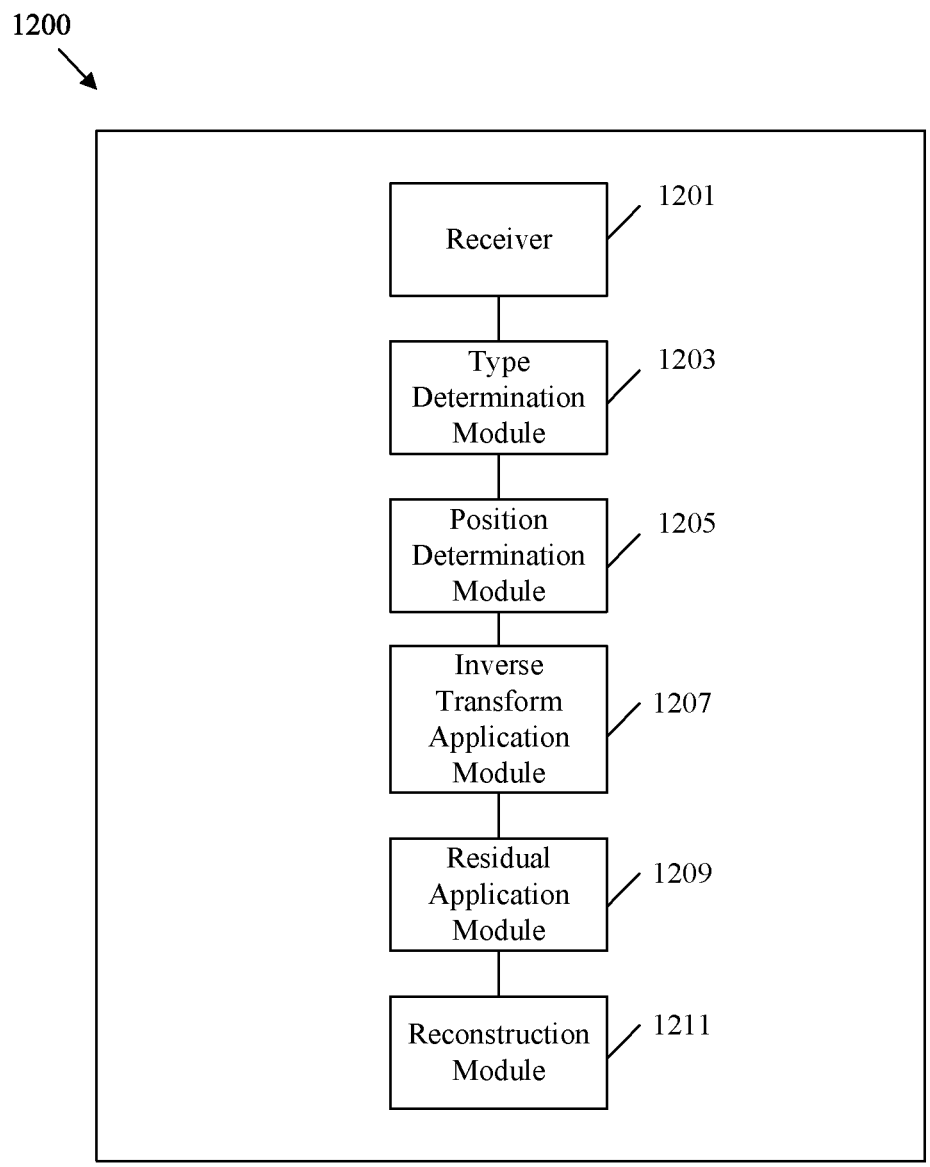
FIG. 12 is an embodiment of a device for determining an SVT size and position.

FIG. 12 is an embodiment of a device 1200 for determining an SVT size and position. For example, the device 1200 may be employed to perform method 1000, and hence may employ transform coefficient groups 900 to signal SVT information. Further, the device 1200 may employ a vertical SVT 543 and/or 743 or a horizontal SVT 643 and/or 843 to transform a residual block. Hence, device 1200 can be employed to perform parts of steps 105 and/or 113 of method 100. Further, the device 1200 can be employed by a transform scaling and quantization component 213, a scaling and inverse transform component 229, a transform and quantization component 313, an inverse transform and quantization component 329, and/or an inverse transform and quantization component 429.

The device 1200 includes a receiver 1201 configured to receive a bitstream including a prediction block and a residual block with coefficients transformed by a SVT. The device 1200 further comprises a type determination module 1203 configured to determine a type of SVT block employed to transform the coefficients in the residual block. The device 1200 further comprises a position determination module 1205 configured to determine a position of the SVT block relative to the residual block by determining a candidate position step size and a position index for the SVT block. The device 1200 further comprises an inverse transform application module 1207 configured to apply an inverse transform to the coefficients based on the SVT block type and position to create a reconstructed residual block. The device 1200 further comprises a residual application module 1207 configured to apply the reconstructed residual block to the prediction block to reconstruct a video block. The device 1200 further comprises a reconstruction module 1211 configured to reconstruct a video sequence for display, the video sequence including a video frame that includes the reconstructed video block.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method comprising:
receiving a bitstream including a prediction block and a residual block with coefficients transformed by a Spatial Varying Transform (SVT);
determining a type of SVT block employed to transform the coefficients in the residual block;
determining a position of the SVT block relative to the residual block using an integer representing a pre-defined step size, a position index for the SVT block, and a height or width of the residual block, wherein the pre-defined step size is greater than one and is based on the height or width of the residual block, wherein the position index for the SVT block is derived based on levels of the coefficients received in the bitstream;
applying an inverse transform to the coefficients based on the SVT block type and the position to create a reconstructed residual block;
applying the reconstructed residual block to the prediction block to reconstruct a video block; and
reconstructing a video sequence for display, the video sequence including a video frame that includes the reconstructed video block.

2. The method of claim 1, wherein the type of SVT block is selected from a group consisting of a vertical SVT block and a horizontal SVT block, the vertical SVT block including a height equal to the height of the residual block and including a width equal to one half of the width of the residual block, and the horizontal SVT block including a height equal to one half of the height of the residual block and including a width equal to the width of the residual block.

3. The method of claim 1, wherein the position of the SVT block is determined by multiplying the pre-defined step size and a position index.

4. The method of claim 2, wherein the pre-defined step size is determined for a vertical SVT block type by dividing the width of the residual block by a predetermined integer (M1) or determined for a horizontal SVT block type by dividing the height of the residual block by a predetermined integer (M2).

5. The method of claim 4, wherein the pre-defined step size is determined for the vertical SVT block by selecting a maximum value between a minimum step size (Th1) and a result of dividing the width of the residual block by M1, and wherein the pre-defined step size is determined for the horizontal SVT block by selecting a maximum value between a minimum step size (Th2) and a result of dividing the height of the residual block by M2.

6. The method of claim 5, wherein M1 is set to eight when the width of the residual block is greater than or equal to the height of the residual block and set to four when the width of the residual block is less than the height of the residual block, and wherein M2 is set to eight when the height of the residual block is greater than or equal to the width of the residual block and set to four when the height of the residual block is less than the width of the residual block.

7. The method of claim 5, wherein M1, M2, Th1, Th2, or combinations thereof are obtained from a syntax element in the bitstream.

8. The method of claim 1, further comprising obtaining the position index from the bitstream.

9. The method of claim 1, further comprising determining the position index by applying an arithmetic operation on the coefficients in the residual block.

10. The method of claim 9, wherein the arithmetic operation includes a sum operation, a modulo operation, division operation, or combinations thereof.

11. The method of claim 9, wherein the position index is obtained from the bitstream when a number of coefficients is less than or equal to a threshold, and wherein the position index is determined by applying the arithmetic operation to the coefficients when the number of coefficients is greater than the threshold.

12. The method of claim 1, wherein the SVT block type is determined based on a first group of coefficients, and the position index is determined based on a second group of coefficients.

13. The method of claim 1, wherein the pre-defined step size or a corresponding number of candidate positions is determined based on a number or position of non-zero coefficients.

14. A video coding device comprising:
a receiver configured to receive a bitstream including a prediction block and a residual block with coefficients transformed by a Spatial Varying Transform (SVT); and
a processor coupled to the receiver, the processor configured to:
determine a type of SVT block employed to transform the coefficients in the residual block;
determine a position of the SVT block relative to the residual block using an integer representing a pre-defined step size, a position index for the SVT block, and a height or width of the residual block, wherein the pre-defined step size is greater than one and is based on the height or width of the residual block, wherein the position index for the SVT block is derived based on levels of the coefficients received in the bitstream;
apply an inverse transform to the coefficients based on the SVT block type and the position to create a reconstructed residual block;
apply the reconstructed residual block to the prediction block to reconstruct a video block; and
reconstruct a video sequence for display, the video sequence including a video frame that includes the reconstructed video block.

15. The video coding device of claim 14, wherein the type of SVT block is selected from a group consisting of a vertical SVT block and a horizontal SVT block, the vertical SVT block including a height equal to the height of the residual block and including a width equal to one half of the width of the residual block, and the horizontal SVT block including a height equal to one half of the height of the residual block and including a width equal to the width of the residual block.

16. The video coding device of claim 14, wherein the position of the SVT block is determined by multiplying the pre-defined step size and a position index.

17. The video coding device of claim 14, wherein the pre-defined step size is determined for a vertical SVT block type by dividing the width of the residual block by a predetermined integer (M1) or determined for a horizontal SVT block type by dividing the height of the residual block by a predetermined integer (M2).

18. The video coding device of claim 15, wherein the pre-defined step size is determined for the vertical SVT block by selecting a maximum value between a minimum step size (Th1) and a result of dividing the width of the residual block by M1, and wherein the pre-defined step size is determined for the horizontal SVT block by selecting a maximum value between a minimum step size (Th2) and a result of dividing the height of the residual block by M2.

19. The video coding device claim 18, wherein M1 is set to eight when the width of the residual block is greater than or equal to the height of the residual block and set to four when the width of the residual block is less than the height of the residual block, and wherein M2 is set to eight when the height of the residual block is greater than or equal to the width of the residual block and set to four when the height of the residual block is less than the width of the residual block.

20. The video coding device of claim 18, wherein M1, M2, Th1, Th2, or combinations thereof are obtained from a syntax element in the bitstream.

21. The video coding device of claim 14, wherein the processor is further configured to obtain the position index from the bitstream.

22. The video coding device of claim 14, wherein the processor is further configured to determine the position index by applying an arithmetic operation on the coefficients in the residual block.

23. The video coding device of claim 22, wherein the arithmetic operation includes a sum operation, a modulo operation, division operation, or combinations thereof.

24. The video coding device of claim 22, wherein the position index is obtained from the bitstream when a number of coefficients is less than or equal to a threshold, and wherein the position index is determined by applying the arithmetic operation to the coefficients when the number of coefficients is greater than the threshold.

25. The video coding device of claim 14, wherein the SVT block type is determined based on a first group of coefficients, and the position index is determined based on a second group of coefficients.

26. The video coding device of claim 14, wherein the pre-defined step size or a corresponding number of candidate positions is determined based on a number or position of non-zero coefficients.

27. The method of claim 1, further comprising balancing data loss with coding efficiency during application of the inverse transform to the coefficients.

* * * * *